US008233251B2

(12) United States Patent
Huang et al.

(10) Patent No.: US 8,233,251 B2
(45) Date of Patent: Jul. 31, 2012

(54) CIRCUIT INTERRUPTING DEVICE WITH INTERCONNECTING RESET AND TEST BUTTONS

(75) Inventors: Huadao Huang, Wenzhou (CN); Huayang Lu, Shanghai (CN)

(73) Assignee: Huadao Huang (CN)

(*) Notice: Subject to any disclaimer, the term of this patent is extended or adjusted under 35 U.S.C. 154(b) by 768 days.

(21) Appl. No.: 12/314,293

(22) Filed: Dec. 8, 2008

(65) Prior Publication Data

US 2009/0161271 A1 Jun. 25, 2009

Related U.S. Application Data

(63) Continuation-in-part of application No. 12/216,952, filed on Jul. 14, 2008, which is a continuation-in-part of application No. 12/000,530, filed on Dec. 13, 2007, now Pat. No. 7,940,498.

(30) Foreign Application Priority Data

| | | |
|---|---|---|
| Sep. 30, 2007 | (CN) | 2007 2 0178404 U |
| Sep. 30, 2007 | (CN) | 2007 2 0178405 U |
| Sep. 30, 2007 | (CN) | 2007 2 0178406 U |
| Sep. 30, 2007 | (CN) | 2007 2 0178407 U |

(51) Int. Cl.
*H02H 3/16* (2006.01)
*H01H 73/44* (2006.01)

(52) U.S. Cl. ................. 361/42; 361/45; 361/49; 335/21

(58) Field of Classification Search .................... 361/42, 361/45, 49; 335/21
See application file for complete search history.

(56) References Cited

U.S. PATENT DOCUMENTS

| | | | |
|---|---|---|---|
| 4,315,328 | A | 2/1982 | Schwab |
| 4,386,338 | A | 5/1983 | Doyle et al. |
| 4,518,945 | A | 5/1985 | Doyle et al. |
| 4,595,894 | A | 6/1986 | Doyle et al. |
| 4,831,496 | A | 5/1989 | Brant et al. |
| 5,202,662 | A | 4/1993 | Bienwald et al. |
| 5,594,398 | A | 1/1997 | Marcou et al. |
| 5,654,857 | A | 8/1997 | Gershen |
| 5,680,287 | A | 10/1997 | Gernhard et al. |
| 5,963,408 | A | 10/1999 | Neiger et al. |
| 6,040,967 | A | 3/2000 | DiSalvo |
| 6,052,265 | A | 4/2000 | Zaretsky et al. |
| 6,111,733 | A | 8/2000 | Neiger et al. |
| 6,226,161 | B1 | 5/2001 | Neiger et al. |
| 6,246,558 | B1 | 6/2001 | DiSalvo et al. |
| 6,252,407 | B1 | 6/2001 | Gershen |
| 6,282,070 | B1 | 8/2001 | Ziegler et al. |
| 6,288,882 | B1 | 9/2001 | DiSalvo et al. |
| 6,309,248 | B1 | 10/2001 | King |
| 6,381,112 | B1 | 4/2002 | DiSalvo |
| 6,437,953 | B2 | 8/2002 | DiSalvo et al. |

(Continued)

*Primary Examiner* — Rexford Barnie
*Assistant Examiner* — Zeev V Kitov
(74) *Attorney, Agent, or Firm* — Andrews Kurth LLP; Aldo Noto

(57) ABSTRACT

The present invention provides a novel circuit interrupting device, preferably a ground fault circuit interrupter, which contains a reset button that is capable of interacting with a test button to perform an end-of-life-component test on the circuit interrupting device. The circuit interrupting device also contains a reset switch coupled to the reset button which is capable of disallowing reset if the device is miswired and/or fails the end-of-life-component test. Only when the circuit interrupting device is properly wired, in a tripped state, and all of the key components in the circuit interrupting device are working properly, the depression of the reset button allows the device to be reset.

21 Claims, 21 Drawing Sheets

U.S. PATENT DOCUMENTS

| | | | |
|---|---|---|---|
| 6,442,007 | B1 | 8/2002 | Li |
| 6,469,881 | B2 | 10/2002 | Gershen et al. |
| 6,522,510 | B1 | 2/2003 | Finlay et al. |
| 6,580,344 | B2 | 6/2003 | Li |
| 6,671,145 | B2 | 12/2003 | Germain et al. |
| 6,864,766 | B2 | 3/2005 | DiSalvo et al. |
| 6,900,972 | B1 * | 5/2005 | Chan et al. .................... 361/111 |
| 6,943,309 | B2 | 9/2005 | Huang et al. |
| 6,952,150 | B2 | 10/2005 | Radosavljevic et al. |
| 6,958,895 | B1 | 10/2005 | Radosavljevic et al. |
| 6,963,260 | B2 | 11/2005 | Germain et al. |
| 6,998,945 | B2 | 2/2006 | Huang et al. |
| 7,009,474 | B2 * | 3/2006 | Germain et al. ................ 335/18 |
| 7,019,952 | B2 | 3/2006 | Huang et al. |
| 7,049,910 | B2 | 5/2006 | Campolo et al. |
| 7,049,911 | B2 | 5/2006 | Germain et al. |
| 7,068,481 | B2 | 6/2006 | Radosavljevic et al. |
| 7,154,718 | B1 | 12/2006 | Finlay, Sr. et al. |
| 7,173,799 | B1 * | 2/2007 | Weeks et al. .................... 361/42 |
| 7,195,500 | B2 | 3/2007 | Huang et al. |
| 7,212,386 | B1 | 5/2007 | Finlay, Sr. et al. |
| 7,283,340 | B1 | 10/2007 | Finlay, Sr. et al. |
| 7,295,415 | B2 | 11/2007 | Huang et al. |
| 7,315,227 | B2 | 1/2008 | Huang et al. |
| 7,317,600 | B2 | 1/2008 | Huang et al. |
| 7,733,617 | B2 * | 6/2010 | Baldwin et al. ................. 361/42 |
| 2005/0012575 | A1 | 1/2005 | Huang et al. |

* cited by examiner

CIRCUIT INTERRUPTING DEVICE WITH INTERCONNECTING RESET AND TEST BUTTONS

RELATED APPLICATION

The present application is a continuation-in-part (CIP) application of U.S. patent application Ser. No. 12/216,952, filed on Jul. 14, 2008; which in turn is a CIP of U.S. patent application Ser. No. 12/000,530, filed on Dec. 13, 2007, now U.S. Pat. No. 7,940,498 which in turn claims the priority of Chinese Patent Application Nos. 200720178404.5, 200720178405.x, 200720178407.9, and 200720178406.4, which were all filed on Sep. 30, 2007, the contents of which are herein incorporated by reference.

FIELD OF THE INVENTION

The present invention relates to a novel circuit interrupting device, preferably a ground fault circuit interrupter, which contains a reset button that is capable of interacting with a test button to perform an end-of-life-component test on the circuit interrupting device. The circuit interrupting device also contains a reset switch coupled to the reset button which is capable of disallowing reset if the device is miswired and/or fails the end-of-life-component test. Only when the circuit interrupting device is properly wired, in a tripped state, and all of the key components in the circuit interrupting device are working properly, the depression of the reset button allows the device to be reset.

BACKGROUND OF THE INVENTION

The new Underwriter's Laboratories (UL) amendment effective July 2006 required that the input terminal (i.e., the line terminal), the output terminal (i.e., the load terminal), and the user accessible output terminal (i.e., the user accessible load terminals or the outlet plugs) of a ground fault circuit interrupter (GFCI) sold in the U.S. be electrically separated from each other when the GFCI is in the tripped state. The same amendment further required that the GFCI have the capability of alerting the end users if one or more of the key components of the GFCI are not working properly. This is called the "end-of-life-component test." These, together with the 2003 UL GFCI amendment, which required that any GFCI sold in the United States have reverse wiring protection capability, are the key functions encompassed in the present invention which will be further described below.

SUMMARY OF THE INVENTION

The present invention provides embodiments which can be adopted by a circuit interrupting device either separately or in any combinations to provide various features and functions to the circuit interrupting device.

An embodiment of the present invention provides a circuit interrupting device, preferably a ground fault circuit interrupter (GFCI), which is characterized by having a pair of power input terminals, a pair of power output terminals, and a pair of user accessible output terminals which are electrically separated from each other in a tripped state and electrically connected in a reset state. The circuit interrupting device further includes a reset button, a test button, a flexible metal piece located below the test button, and a test resistor located below the flexible metal piece. One end of the flexible metal piece is positioned below the test button and the other end passes through the differential transformers and is electrically connected to one of the pair of power input terminals. One end of the test resistor is suspended below the flexible metal piece and the other end is connected to one of the pair of power input terminals.

When the circuit interrupting device is properly wired and at a tripped state, a depression of the reset button drives the test button to move downwards with the reset button so that the flexible metal piece comes into contact with the test resistor to generate a simulated leakage current to test whether components of the circuit interrupting device are working properly. When the components (such as a differential transformer, a leakage circuit detection integrated chip, a silicon controlled rectifier (SCR), and/or a solenoid coil) of the circuit interrupting device are working properly, the device is capable of being reset. When at least one of the key components of the circuit interrupting device is not working properly, the device cannot be reset. The test resistor is disconnected from the flexible metal piece when the reset button is at the tripped or reset state.

When the circuit interrupting device is in the reset state, a depression of the test button causes the flexible metal piece and the test resistor to be in contact with each other to generate a leakage current to trip the circuit interrupting device.

The reset button has a first protrusion extending outward. The test button has a second protrusion extending outward which is at a location corresponding to the first protrusion on the reset button. When the reset button is depressed, the first protrusion on the reset button is in contact with the second protrusion on the test button which drives the test button to move downwards.

The circuit interrupting device further has a power output indicator which is turned on when the components of the circuit interrupting device are working properly.

The circuit interrupting device further comprises: (1) a pair of input flexible metal pieces which is electrically coupled to the pair of power input terminals; each of the pair of power input flexible metal pieces contains a movable contact; (2) a pair of output terminal metal pieces which is coupled to the pair of power output terminals; each of the pair of power output terminal metal pieces contains a pair of fixed contacts; and (3) a pair of user accessible output flexible metal pieces which is electrically coupled to a pair of output conductors which in turn is electrically connected to the pair of user accessible output terminals; each of the pair of user accessible output flexible metal pieces contains a movable contact. The movable contact on each of the pair of input flexible metal pieces and the movable contact on each of the pair of output metal pieces are capable of connecting to or disconnecting from the pair of fixed contacts on each of the output terminal metal pieces respectively.

The circuit interrupting device further comprises a reset/tripping mechanical device capable of causing the pair of input flexible metal pieces, the pair of user accessible output flexible metal pieces, and the pair of output terminal metal pieces to be connected or disconnected. The reset/tripping mechanical device comprises: (1) a reset button; (2) a reset directional lock located under the reset button; the reset directional lock has a blunt bottom surface; (3) a reset spring slid onto an upper part of the reset directional lock; a quick trip spring slid onto a lower part of the reset directional lock; (4) a tripping device; (5) a locking member; and (6) a reset switch.

When the circuit interrupting device is properly wired and the reset button is depressed, if the components of the circuit interrupting device are working properly, the reset/tripping mechanical device causes the circuit interrupting device to be reset; and if at least one of said components of said circuit interrupting device is not working properly, the reset/tripping mechanical device does not allow the circuit interrupting device to be reset.

The circuit interrupting device further comprises a reset switch which is coupled to the reset button. The reset switch comprises a top metal piece, a middle metal piece, and a bottom electric contact. The top metal piece is located at the top of the reset switch, the middle metal piece is located below the top metal piece; and the bottom electric contact is located below the middle metal piece. When the reset button is at the tripped state, none of the top metal piece, the middle metal piece, and the bottom electric contact is in contact with each other. When the reset button is depressed, the middle metal piece and the bottom electric contact come into contact with each other. When the reset button is at the reset state, the top metal piece and the middle metal piece come into contact with each other.

Each of the top metal piece, the middle metal piece, and the bottom electric contact is electrically connected to one of the pair of power input terminals. Preferably, the top metal piece is electrically coupled to a neutral power input terminal, the middle metal piece is electrically coupled to a hot power input terminal, and the bottom electric contact is electrically coupled to the neutral power input terminal. More preferably, the top metal piece and the bottom electric contact, respectively, are electrically connected to the neutral power input terminal via a silicon controlled rectifier (SCR); and the middle metal piece is electrically connected to the hot power input terminal via a solenoid coil.

The tripping device extends outwards to form a pair of lifting arms. The pair of the input flexible metal pieces and the pair of user accessible output flexible metal pieces are rested on said pair of lifting arms.

Preferably, the reset directional lock has a larger diameter in the upper part than that in the lower part.

The circuit interrupting device further comprises a pair of discharge metal pieces electrically coupled to the pair of power input terminals. Each of the pair of discharge metal pieces has a tip facing but not contacting each other. During a high voltage surge, the discharge metal pieces can cause a discharge of electricity through the tips of the discharge metal pieces to protect the circuit interrupting device from being damaged due to the high voltage surge.

Another embodiment of the present invention provides a circuit interrupting device having a pair of power input terminals, a pair of power output terminals, and a pair of user accessible output terminals, which are electrically separated from each other in a tripped state and electrically connected in a reset state. This circuit interrupting device is further characterized to contain a reset switch capable of preventing reset when the circuit interrupting device is not properly wired and/or at least one component (such as a differential transformer, a leakage current detection integrated chip, a silicon controlled rectifier, and/or a solenoid coil) of the circuit interrupting device is not working properly.

The reset switch comprises a top metal piece, a middle metal piece, and a bottom electric contact. The top metal piece is located at the top of the reset switch, the middle metal piece is located below the top metal piece; and the bottom electric contact is located below the middle metal piece. Each of the top metal piece, the middle metal piece, and the bottom electric contact is electrically coupled to one of the pair of power input terminals. The reset switch is adapted to be connected to a reset button. When the reset button is at a tripped state, none of the top metal piece, the middle metal piece, and the bottom electric contact is in contact with each other. When the reset button is depressed, the middle metal piece and the bottom electric are in contact with each other. When the reset button is at a reset state, the top metal piece and the middle metal piece are in contact with each other.

Preferably, the top metal piece and the bottom electric contact are electrically connected to a neutral power input terminal via a silicon controlled rectifier (SCR); and the middle metal piece is electrically connected to a hot power input terminal via a solenoid coil.

The circuit interrupting device further comprises a reset button; a test button; a flexible metal piece located underneath the test button; and a test resistor located below the flexible metal piece. When the circuit interrupting device is properly wired and at the tripped state, a depression of the reset button drives the test button to move downwards with the reset button so that the flexible metal piece underneath the test button comes into contact with the test resistor to generate a simulated leakage current to test whether the components of the circuit interrupting device are working properly. When the components of the circuit interrupting device are working properly, the contact between the middle metal piece and the bottom electric contact allows the circuit interrupting device to be reset. When at least one of the components of the circuit interrupting device is not working properly, the contact between the middle metal piece and the bottom electric contact does not allow the circuit interrupting device to be reset.

Also, when the circuit interrupting device is in the reset state, a depression of the test button causes the flexible metal piece and the test resistor to be in contact with each other to generate a leakage current to trip the circuit interrupting device.

The circuit interrupting device of this embodiment further comprises a power output indicator that is turned on when the components of the circuit interrupting device are working properly.

The circuit interrupting device of this embodiment further comprises: (1) a pair of input flexible metal pieces electrically coupled to the pair of power input terminals; each of the pair of power input flexible metal pieces contains a movable contact; (2) a pair of output terminal metal pieces coupled to the pair of power output terminals; each of the pair of power output terminal metal pieces contains a pair of fixed contacts; and (3) a pair of user accessible output flexible metal pieces electrically coupled to a pair of output conductors that is coupled to the pair of user accessible output terminals; each of the pair of user accessible output flexible metal pieces contains a movable contact. The movable contact on each of the pair of input flexible metal pieces and the movable contact on each of the pair of output metal pieces are capable of connecting to or disconnecting from the pair of fixed contacts on each of the output terminal metal pieces respectively.

The circuit interrupting device of this embodiment further comprises a reset/tripping mechanical device capable of causing the pair of input flexible metal pieces, the pair of user accessible output flexible metal pieces, and the pair of output terminal metal pieces to be connected or disconnected.

The circuit interrupting device further comprises a pair of discharge metal pieces electrically coupled to the pair of power input terminals. Each of the pair of discharge metal pieces has a tip facing but not contacting each other. During a high voltage surge the discharge metal pieces cause a discharge of electricity through the tips of the discharge metal pieces to protect the circuit interrupting device from being damaged due to the high voltage surge.

BRIEF DESCRIPTION OF THE DRAWINGS

FIG. 4-1 and FIG. 4-2 are illustrations of the relationships among the input flexible metal pieces, output conductors, user accessible output flexible metal pieces, and output terminal metal pieces of the present invention and their structures.

FIG. 7-1 is a partial cross-sectional view along the B-B line in FIG. 3. It is an illustration of the relationships among the parts how the GFCI works initially when there is no power output.

FIG. 7-2 is a partial cross-sectional view along the B-B line in FIG. 3. It is an illustration of the relationships among the parts when the reset button is depressed.

FIG. 7-3 is a partial cross-sectional view along the B-B line in FIG. 3. It is an illustration of the relationships among the parts after the device has been reset and the GFCI works normally and has power output.

FIG. 7-4 is a partial cross-sectional view along the B-B line in FIG. 3. It is an illustration of the relationships among the parts when the test button is depressed and released to cut off power output to the load and user accessible load of the GFCI (i.e., to trip the GFCI).

FIG. 8-1 is a partial cross-sectional view along the C-C line in FIG. 3. It is an illustration of the relationships among the parts after the reset button is depressed and the interrupter has power output.

FIG. 8-2 is a partial cross-sectional view along the C-C line in FIG. 3. It is an illustration of the relationships among the parts when the device is tripped and the GFCI has no power output.

FIG. 9-1 is a partial cross-sectional view along the A-A line in FIG. 3. It is an illustration of the relationships among the parts when the device is in a tripped state.

FIG. 9-2 is a partial cross-sectional view along the A-A line in FIG. 3. It is an illustration of the relationships among the parts the instant the reset button is depressed.

FIG. 9-3 is a partial cross-sectional view along the A-A line in FIG. 3. It is an illustration of the relationships among the parts after the device has been reset.

FIG. 10-1 to FIG. 10-4 illustrate exemplary detailed circuitries on the control circuit board of the GFCI of the present invention.

DETAILED DESCRIPTION OF THE INVENTION

The present invention provides a novel circuit interrupting device, preferably in the form of a ground fault circuit interrupter (GFCI), although it is understood to one of ordinary skill in the art that other forms of circuit interrupting devices, such as circuit breaker, contactor, arc fault circuit interrupter, immersion detection circuit interrupter, or appliance leakage circuit interrupter, are encompassed in the present invention. For the convenience of illustration, the disclosure hereinafter will be in the form of a GFCI.

Figure 1:
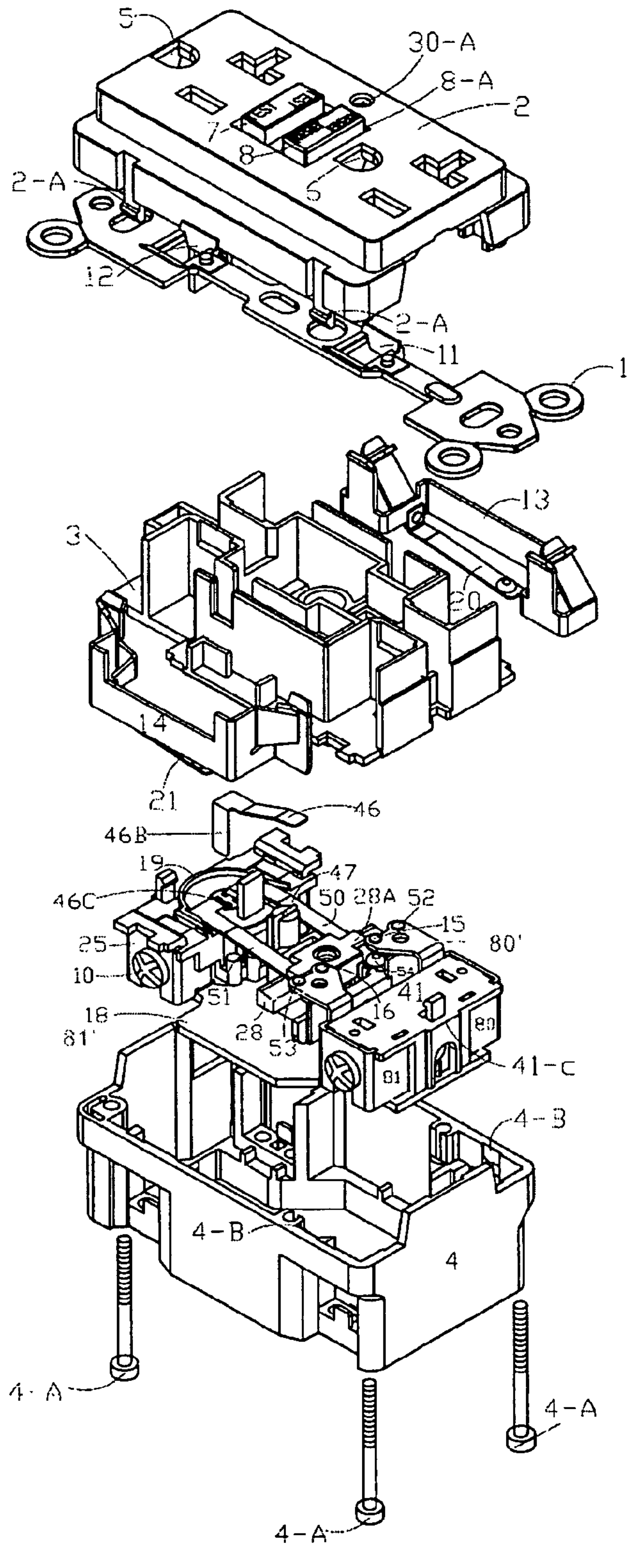
FIG. 1 is an exploded cubic schematic of the structure of the present invention.

As shown in FIG. 1, the GFCI disclosed by the present invention mainly includes a housing, and a circuit board 18 which is installed inside the housing.

Within the housing, there are upper cover 2, insulated middle support 3 and base 4. Between upper cover 2 and insulated middle support 3, there is metal mounting strap 1. Circuit board 18 is installed between insulated middle support 3 and base 4.

Figure 2:
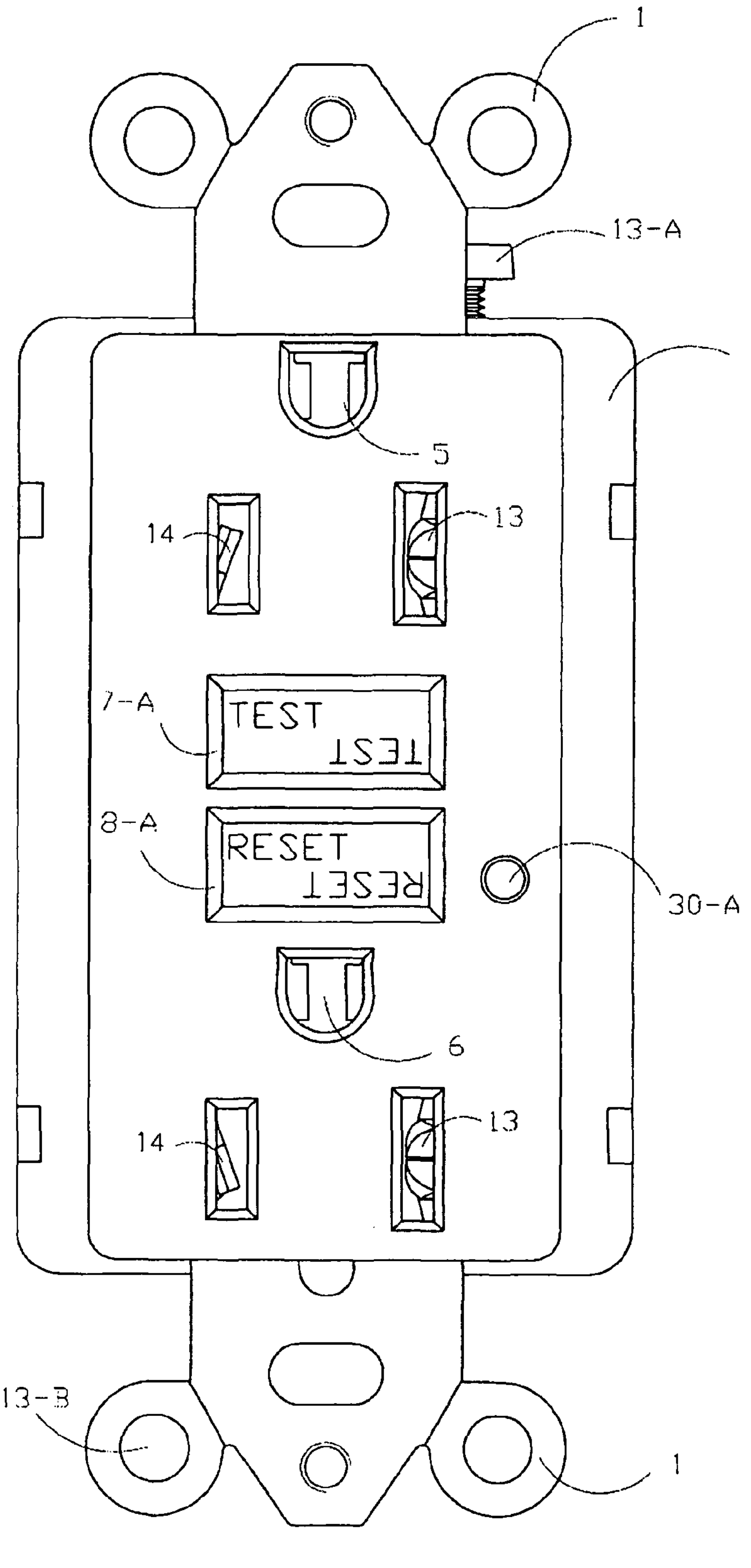
FIG. 2 is the main view of the present invention.

As shown in FIG. 1 and FIG. 2, upper cover 2 contains power output sockets 5 and 6, reset button hole 8-A, test button hole 7-A and status indicator hole 30-A. Reset button (RESET) 8 and test button (TEST) 7 are placed inside reset button hole 8-A and test button hole 7-A, respectively. Reset button 8 and test button 7 pass through metal strap 1 and insulated middle support 3, and come into contact with the component assembly on circuit board 18. There are four clamp hooks 2-A on both sides of upper cover 2 which are used to securely connect base 4 through fasten groove 4-B located on the inner side of base 4.

Metal mounting strap 1 is located between upper cover 2 and insulated middle support 3, and is connected to the ground through grounding screw 13-A. Grounding vanes 11 and 12 are located on metal mounting strap 1, at locations vertically corresponding to the grounding holes on power output sockets 5 and 6 of upper cover 2. Installation holes 13-B are placed on both ends of metal mounting strap 1.

Figure 3:
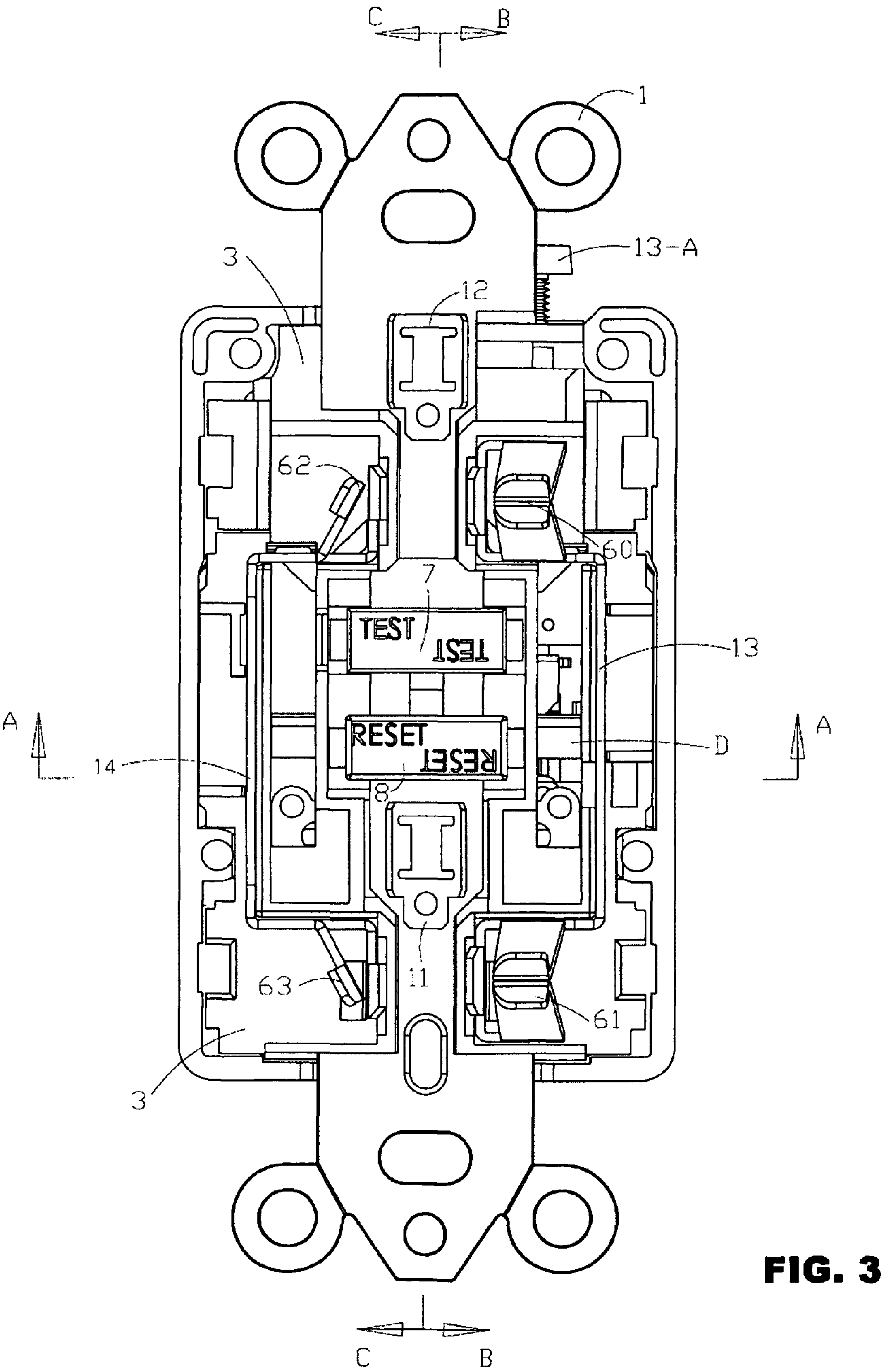
FIG. 3 is the front view of the present invention with the upper lid removed.

As shown in FIG. 1 and FIG. 3, a hot power output conductor 14 and a neutral power output conductor 13 are respectively placed on both sides of insulated middle support 3 within the housing. The two ends of each of the hot power output conductor 14 and neutral power output conductor 13 are extended to contain a pair of gripping wing pieces 60, 61, and 62, 63, respectively. Gripping wing pieces 60, 61, 62 and 63 are located directly under the neutral user accessible outlet plug holes and hot user accessible outlet plug holes of power output sockets 5 and 6 on the upper cover 2.

As shown in FIG. 1, base 4 is used to accommodate insulated middle support 3 and control circuit board 18. On the two sides of base 4, a pair of neutral and hot power input (Line Side) wiring screws 9 and 10 and a pair of neutral and hot power output (Load Side) wiring screws 109 and 110 are symmetrically placed.

The core component of the present invention is control circuit board 18 which is installed within the housing. It has the functions of causing power outlet sockets 5 and 6 on upper cover 2 of the GFCI and power output wiring screws 109 and 110 located on both sides of base 4 to have or not to have power output; testing the components of the GFCI to determine whether these components have come to an end of their service life; displaying the test result by indicator lights on upper cover 2 and causing the reset button to reset or to trip; and protecting the device against high voltage surge such as lightning.

Figure 5:
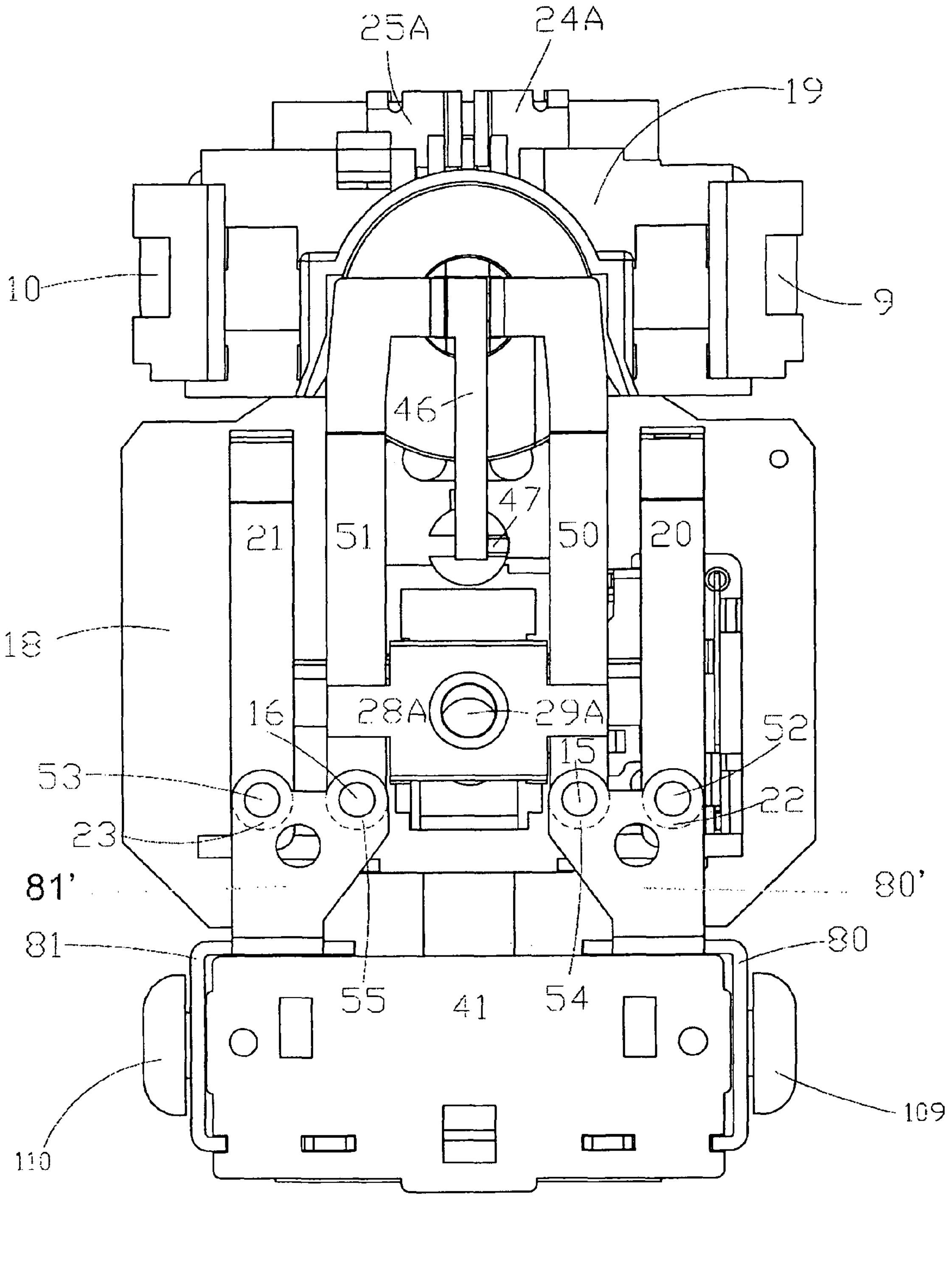
FIG. 5 is an illustration of the relationships among the parts which can be viewed on top of the printed circuit board of the present invention.

As shown in FIG. 1 and FIG. 5, on circuit board 18, there are a pair of hot and neutral power input flexible metal pieces 51 and 50. One end of power input flexible metal pieces 51 and 50 is bent 90 degrees downwards to facilitate power input flexible metal pieces 51 and 50 to pass through differential transformer 19. The power input flexible metal pieces 51 and 50 can either weld onto circuit board 18 or directly connect to hot power line, neutral power input wiring screws 10 and 9 through input power connecting pieces 25 and 24. Hot power input wiring screw 10 is connected to a hot power line inside the wall through a wire. Neutral power input wiring screw 9 is connected to a neutral power line inside the wall through a wire. Movable contacts 55 and 54 are placed on the other end of input flexible metal pieces 51 and 50.

Hot and neutral power output terminal leads 81 and 80 are welded onto the other end of circuit board 18 and come into contact with power output wiring screws 110 and 109. A top end of hot power output terminal lead 81 is protruded sideward to form a hot power output terminal metal piece 81' which contains a pair of fixed contacts 53 and 16. A top end of neutral power output terminal lead 80 is protruded sideward to form a neutral power output terminal metal piece 80' which contains a pair of fixed contacts 52 and 15.

Figures 1, 4:
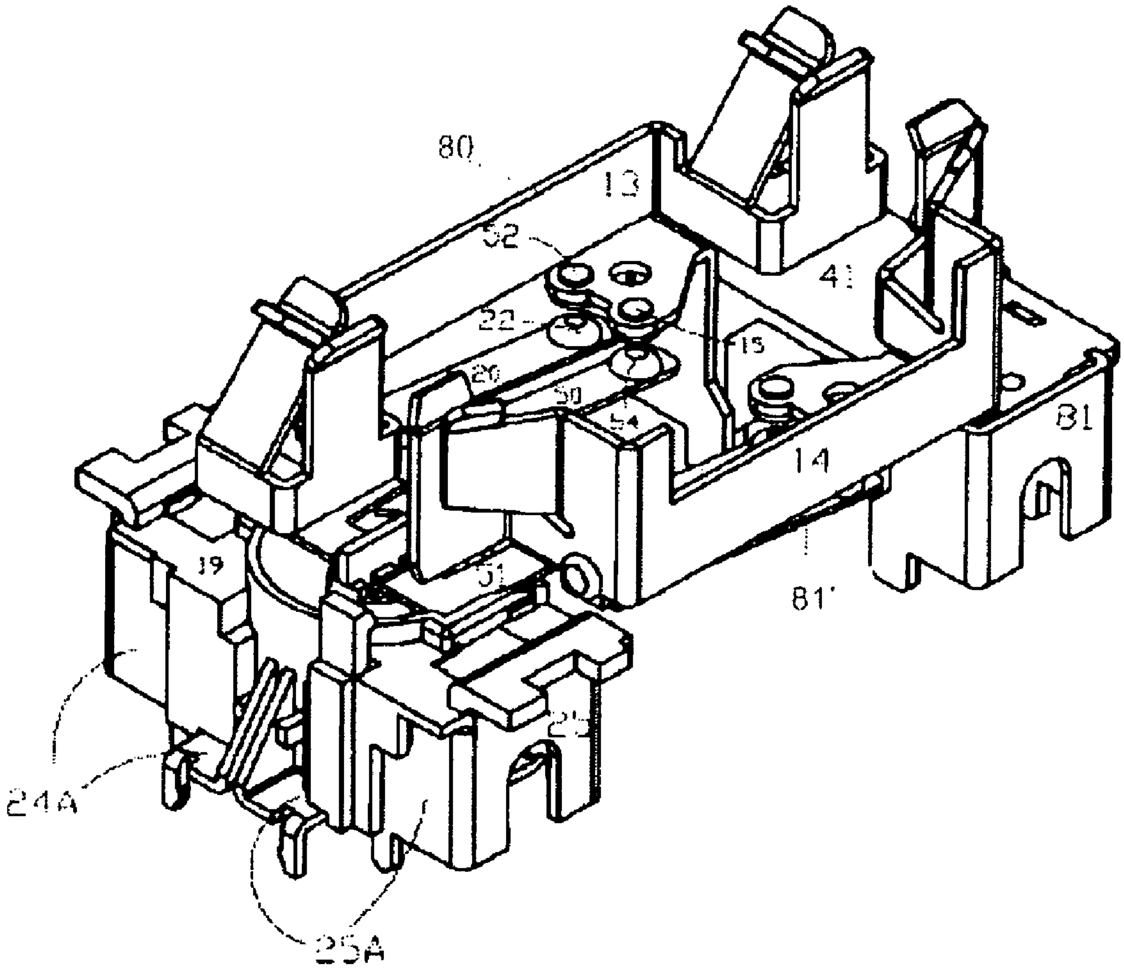
Figures 2, 4:
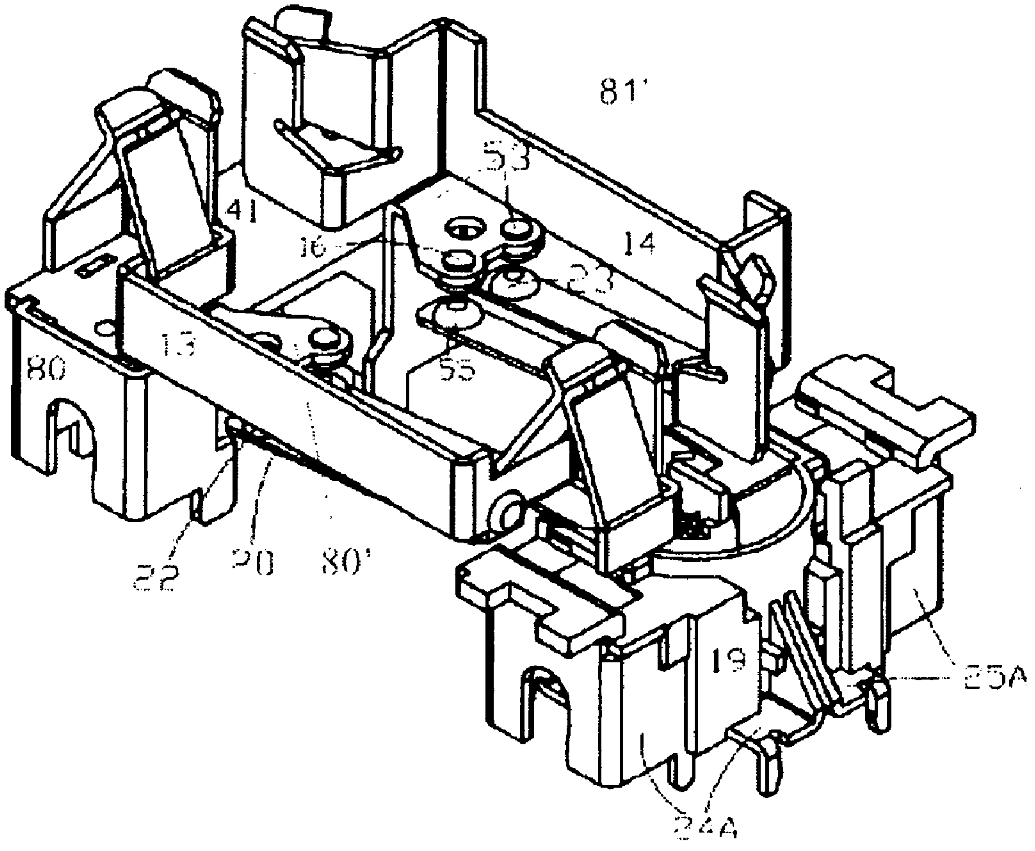

As shown in FIG. 4-1 and FIG. 4-2, on one end of hot power output conductor 14, there is a user accessible output flexible metal piece 21 which is connected to the output conductor 14 by a rivet. A movable contact 23 is attached to the end of user accessible output flexible metal piece 21. Similarly, at one end of neutral power output conductor 13, there is a user accessible output flexible metal piece 20 which is connected to the output conductor 13 by a rivet. A movable contact 22 is attached to the end of user accessible output flexible metal piece 20.

As shown in FIG. 5, movable contacts 54 and 55 on power input flexible metal pieces 51 and 50 respectively mate with fixed contact 16 on hot power output terminal metal piece 81' and fixed contact 15 on neutral power output terminal metal piece 80', forming a group of two power switches which allows/disallows the electricity to flow from a power source (Line) to a load end (Load). Movable contacts 23 and 22 on user accessible output flexible metal pieces 21 and 20 mate with fixed contact 53 on hot power output terminal metal piece 81' and fixed contact 52 on neutral power output terminal metal piece 80', forming a group of two power switches which allows/disallows the electricity to flow from the load end (Load) to the user accessible end (Outlet). The movable contacts on the pair of input flexible metal pieces 51 and 50, and the pair of user accessible output flexible metal pieces 21 and 20 mate with the two pairs of fixed contacts on the pair of output terminal metal pieces 81' and 80' form a total of four power switches 55 and 16, 54 and 15, 23 and 53, and 22 and 52, which respectively correspond to switches KR-2-1, KR-2-2, KR-3-1 and KR-3-2 in wiring diagram in FIG. 10-1 to FIG. 10-4.

Figures 1, 7:
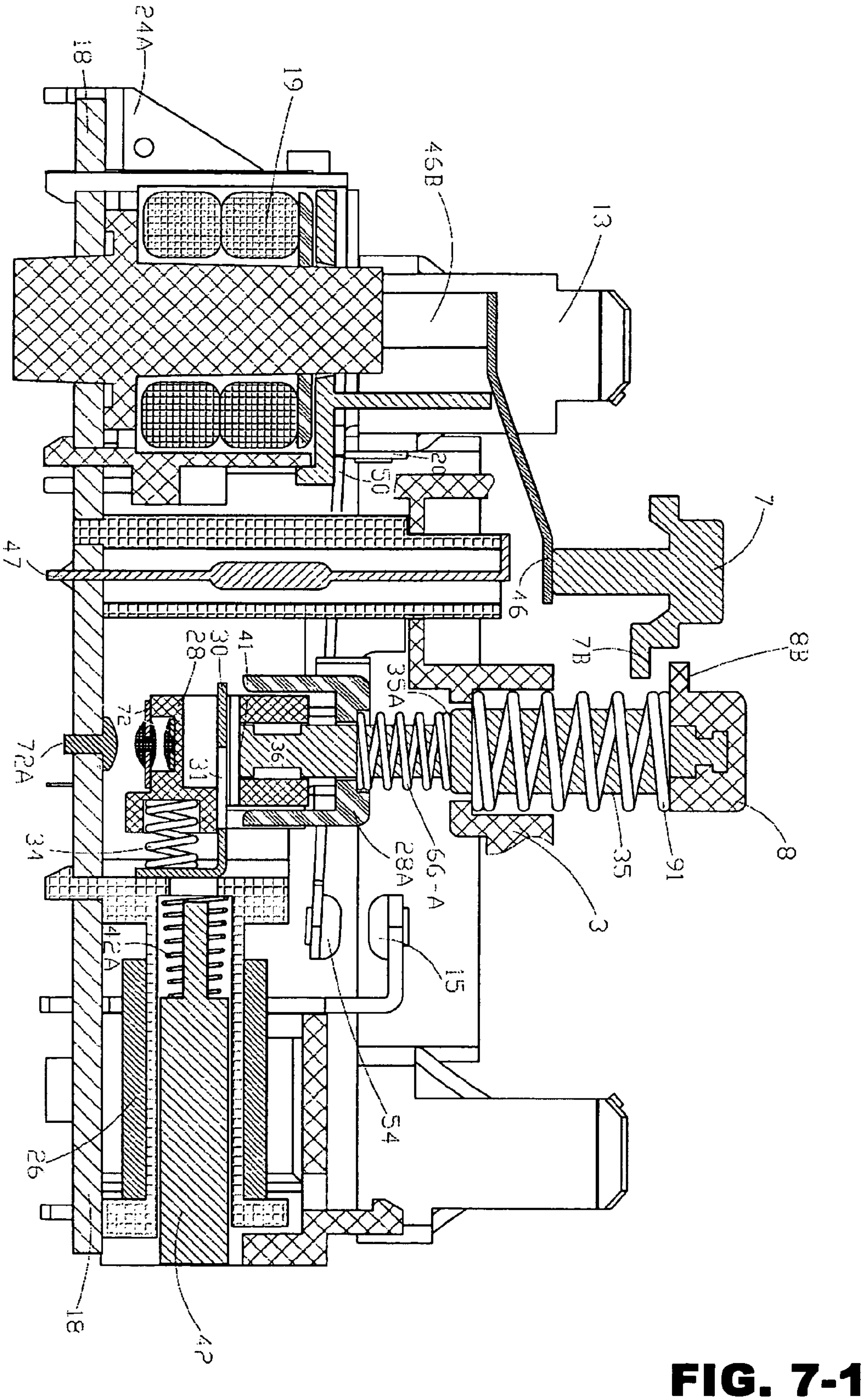
Figures 2, 7:
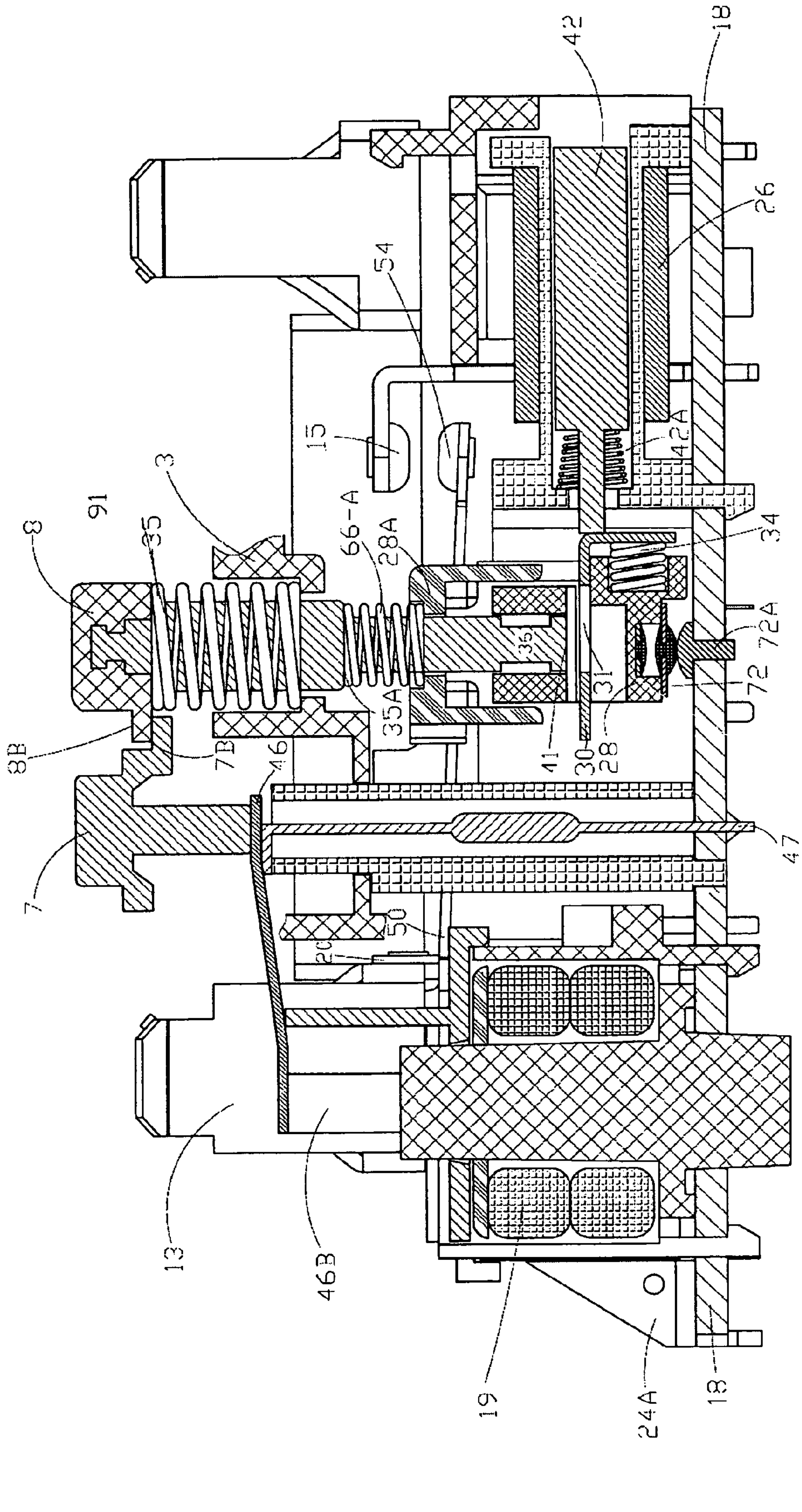
Figures 3, 7:
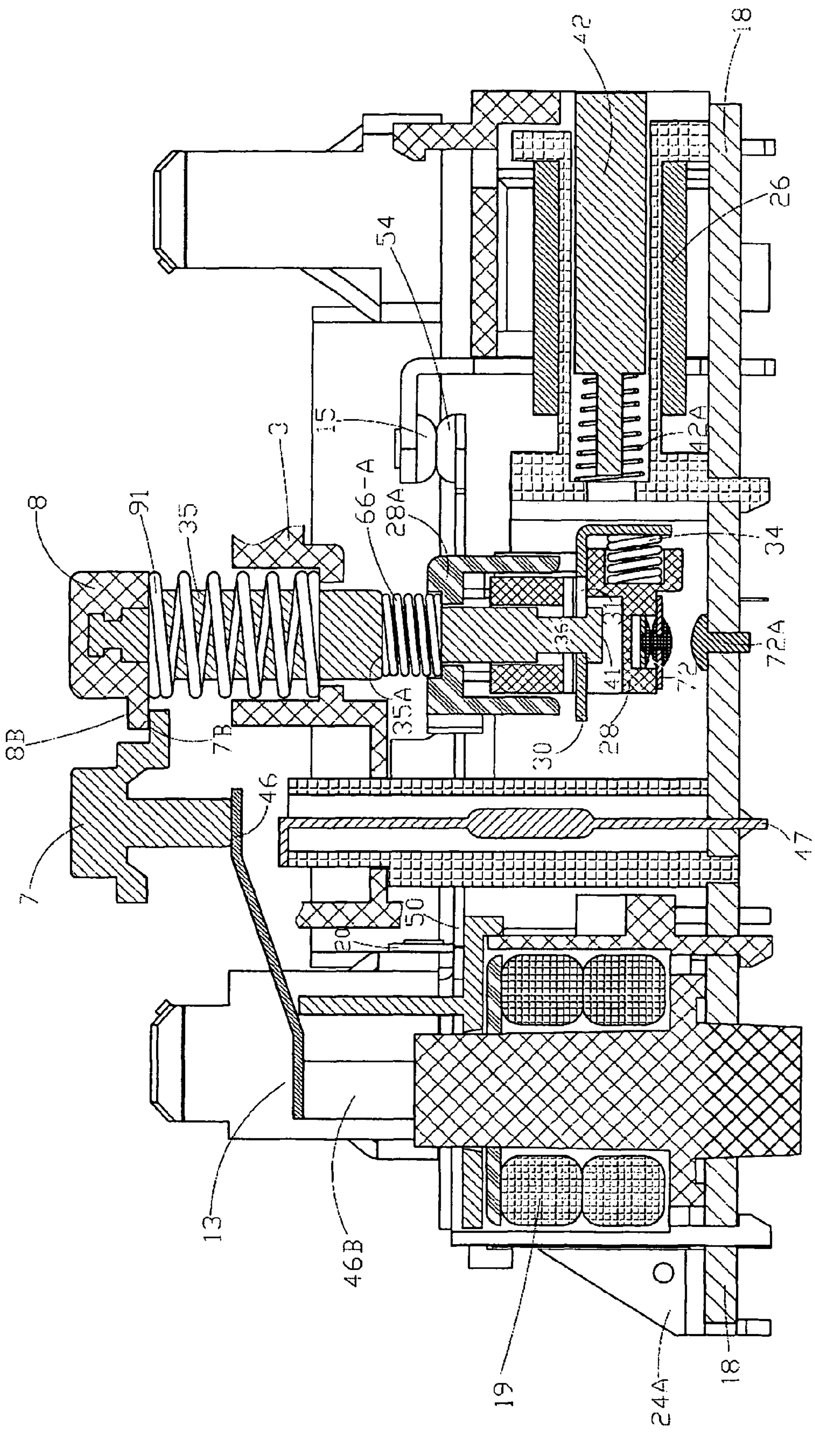
Figures 4, 7:
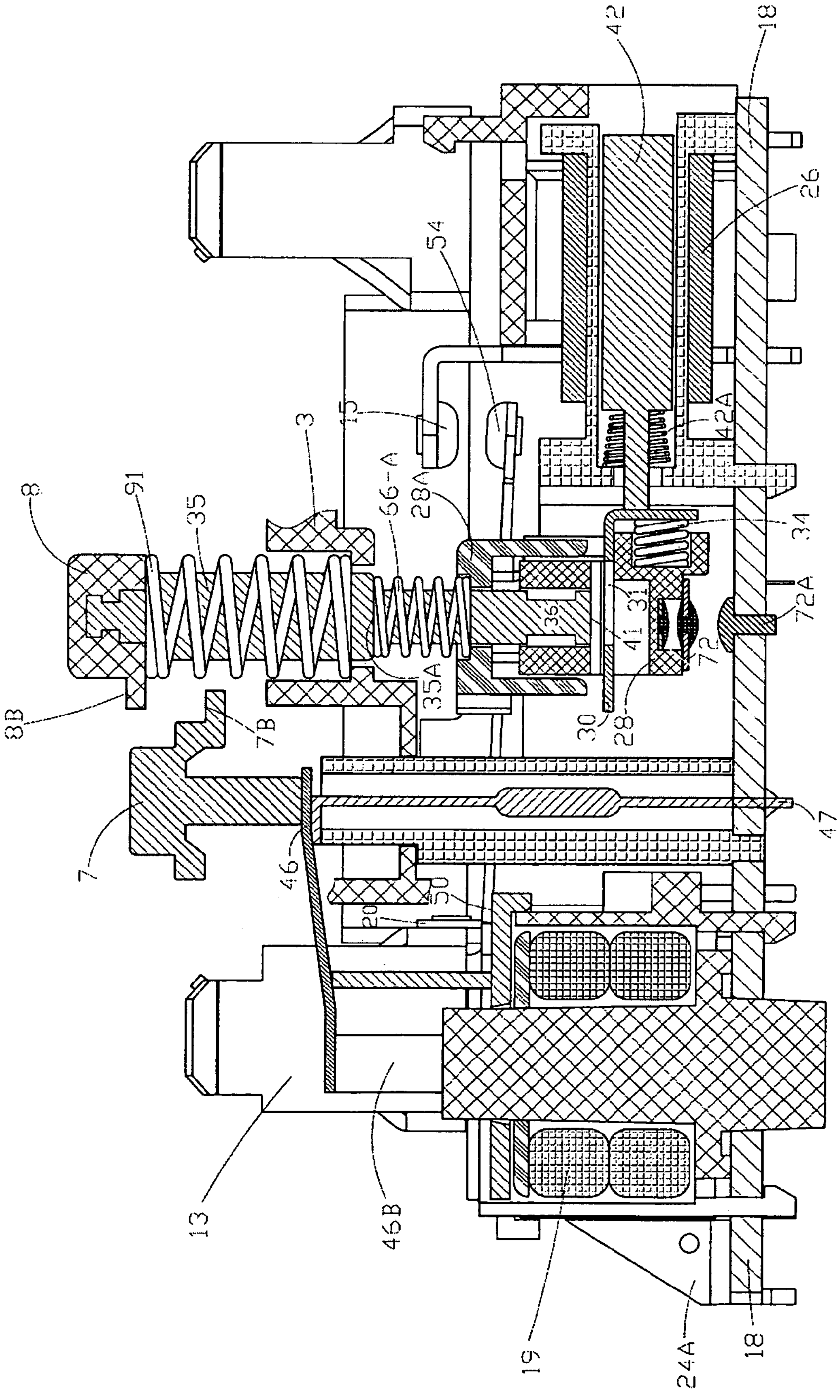
Figures 1, 8:
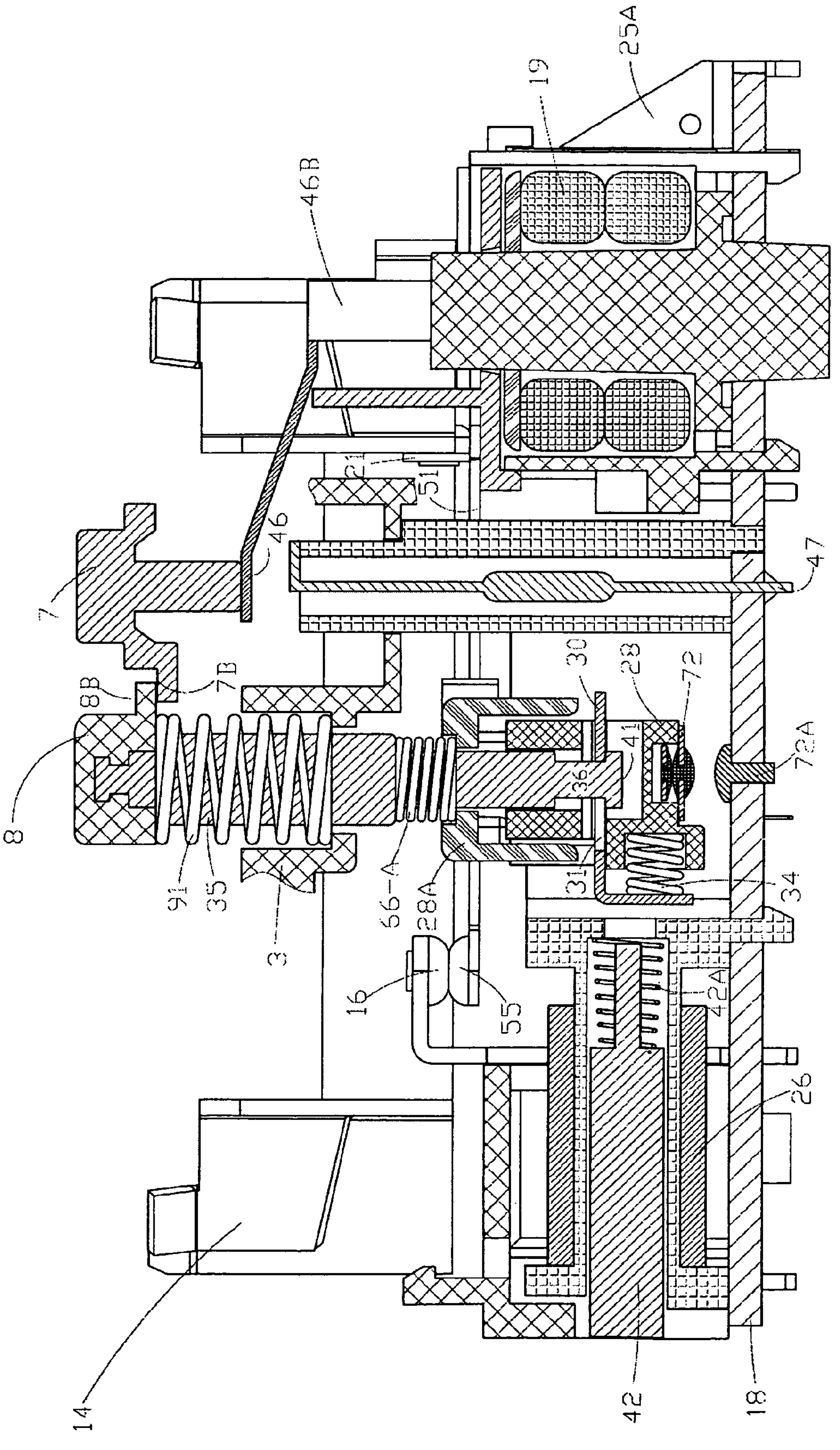
Figures 2, 8:
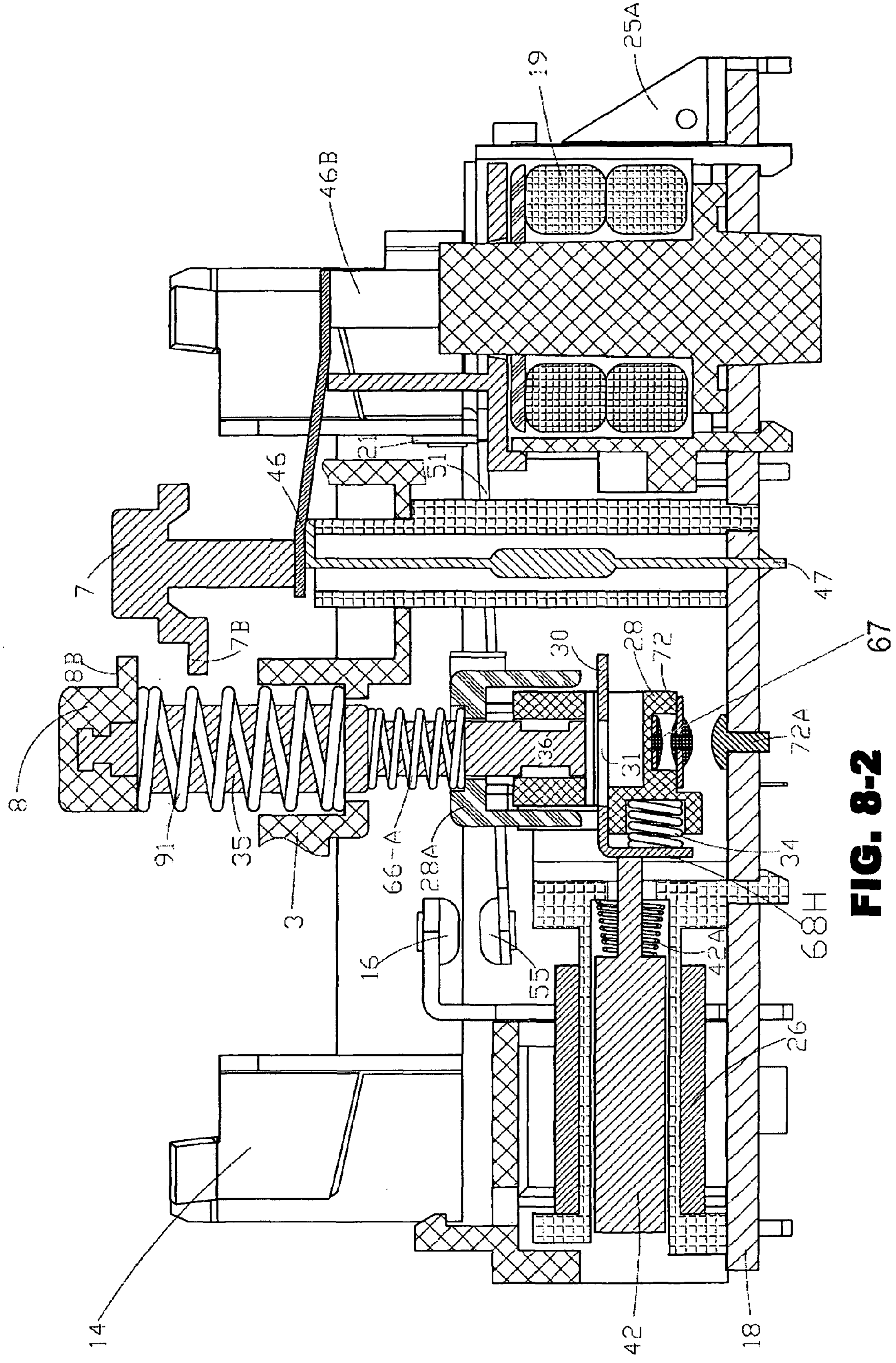
Figures 1, 10:
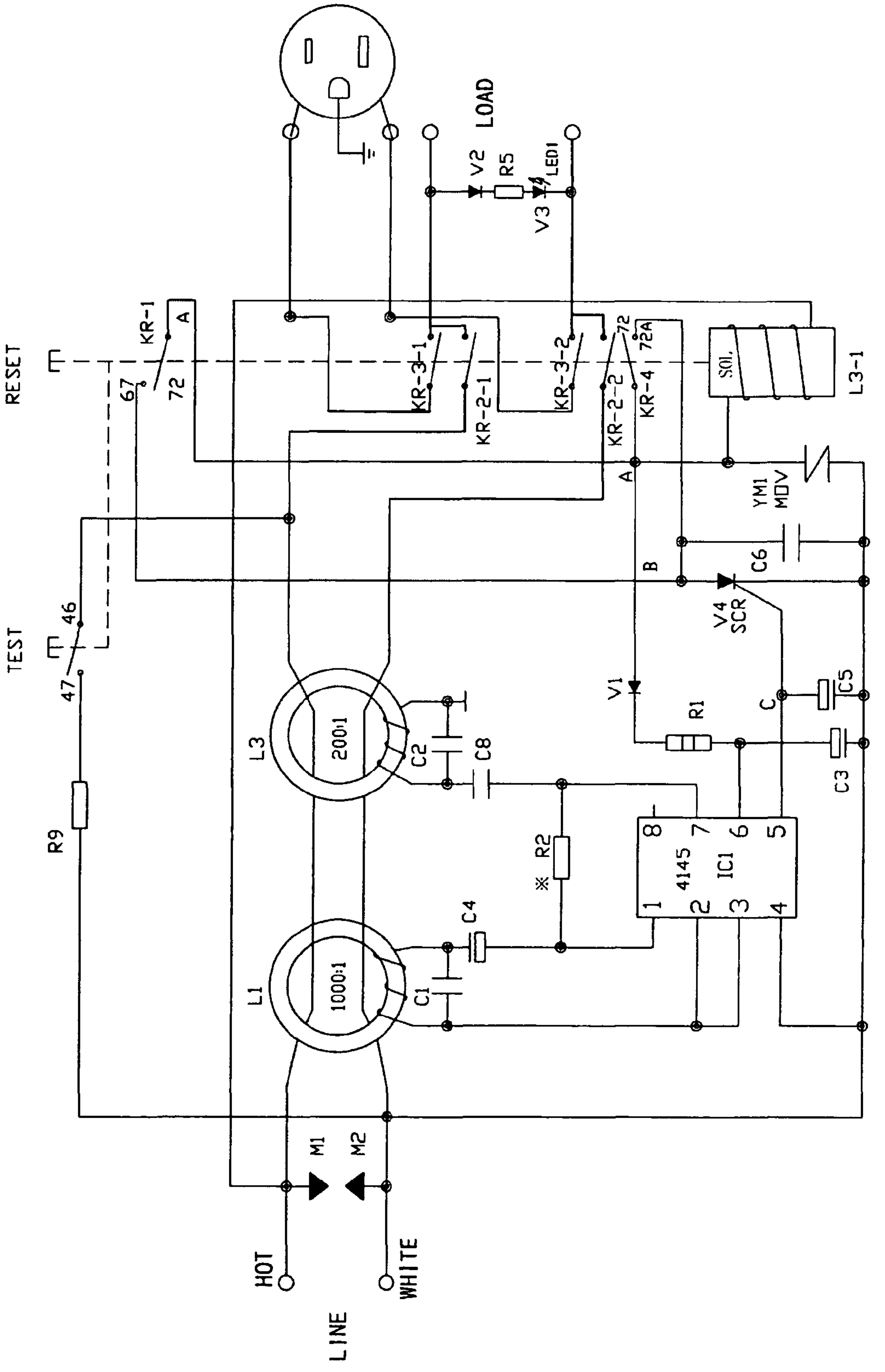
Figures 2, 10:
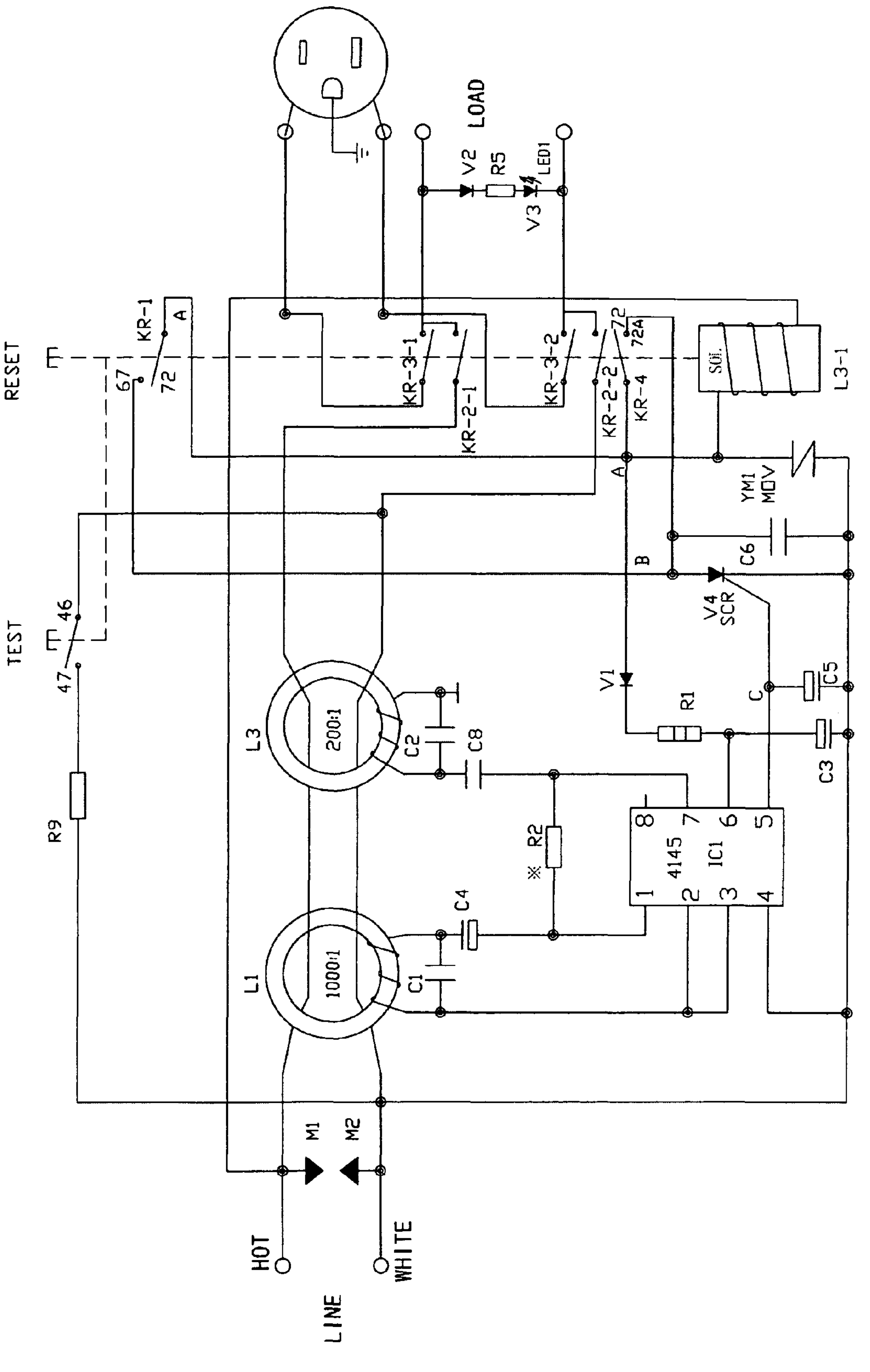
Figures 3, 10:
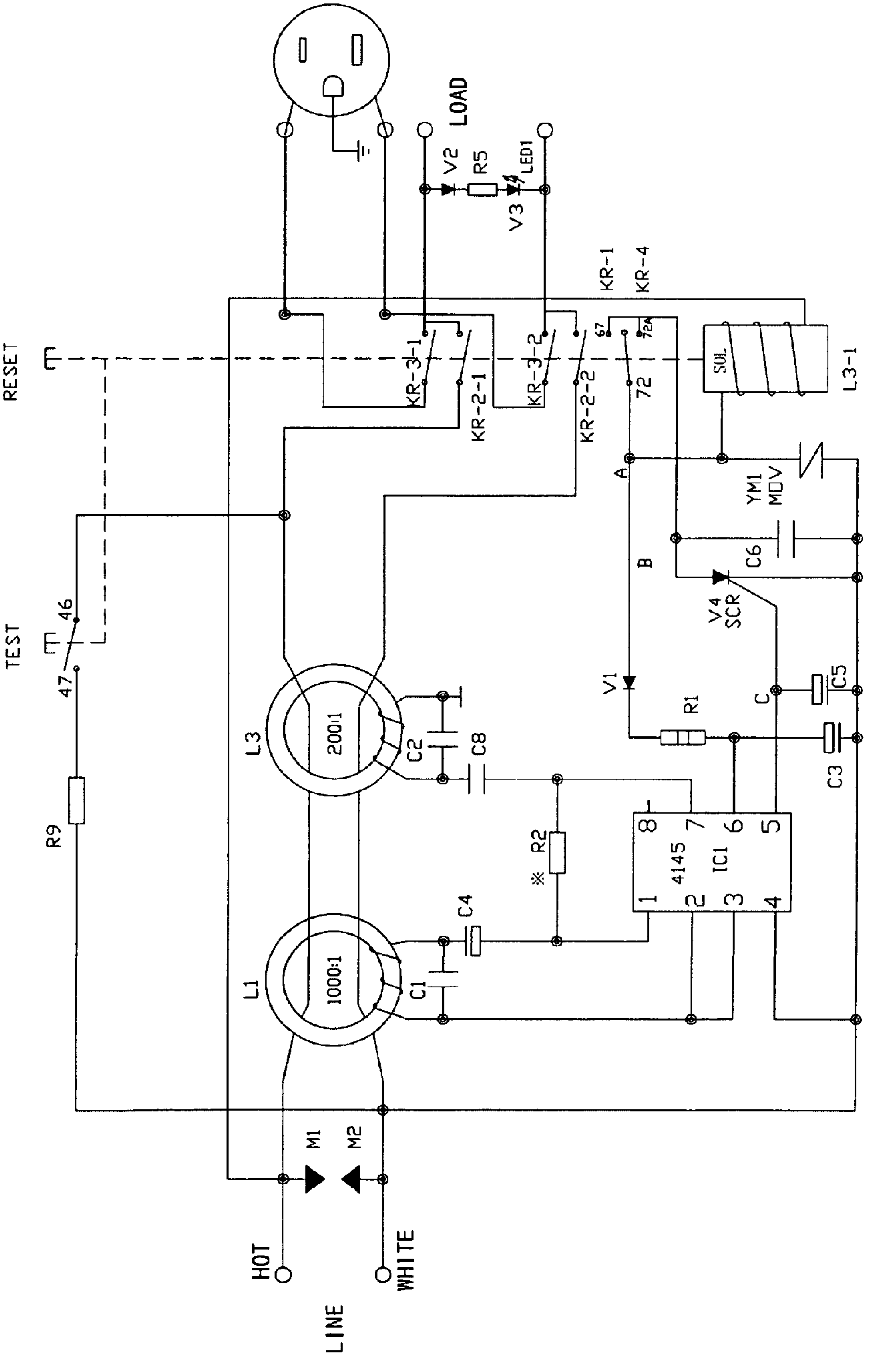
Figures 4, 10:
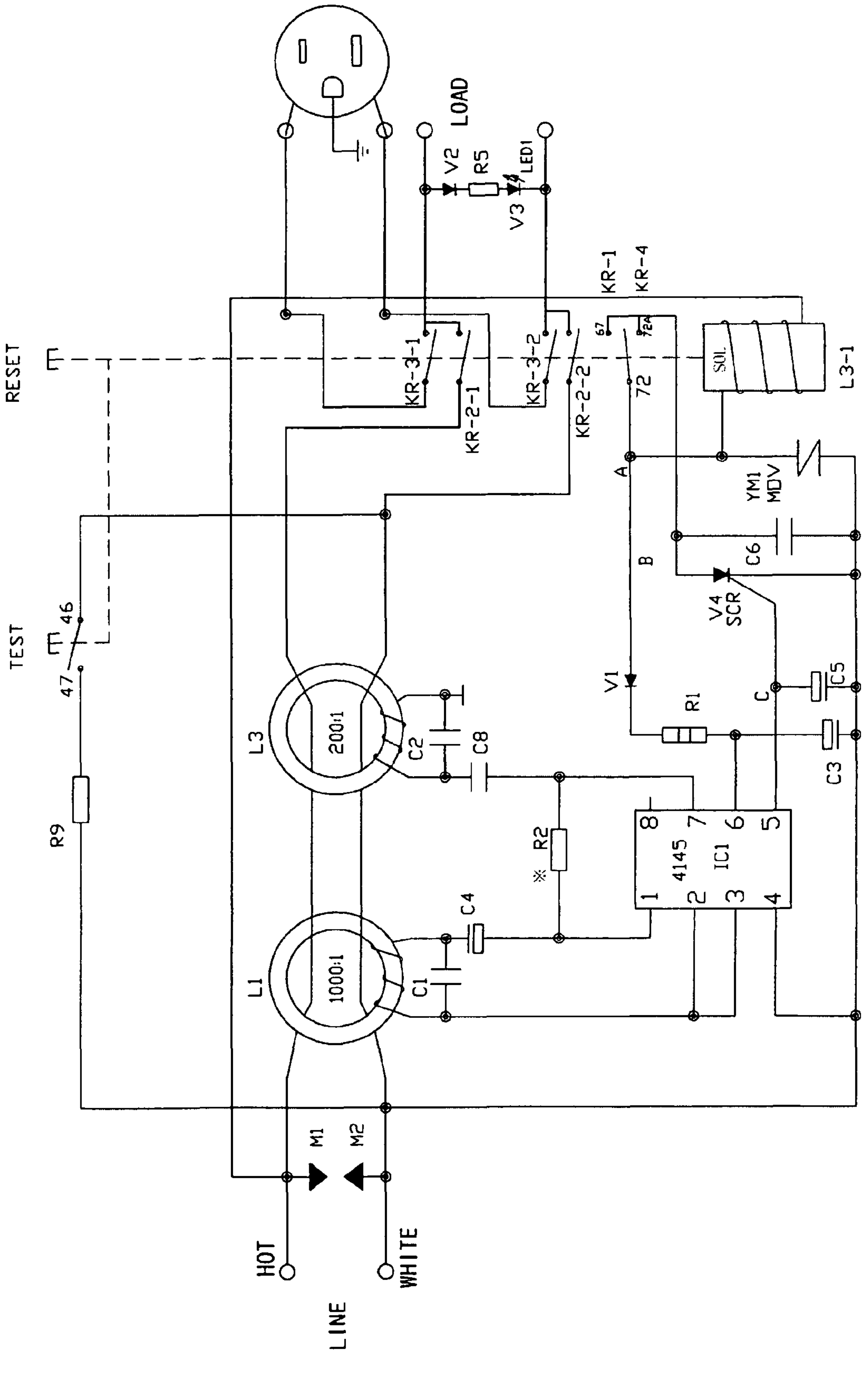

As shown in FIG. 1, FIG. 5 and FIG. 7-1, there is also a differential transformer 19 on circuit board 18 which is used for detecting leakage currents. As shown in FIG. 10-1 to FIG. 10-4, the hot power line HOT and neutral power line WHITE pass through differential transformer 19 (L1 and L2 in the figures). When there is a leakage current (i.e., an imbalance current between the hot and white lines) on the power supply loop, the differential transformer senses the current imbalance and outputs a voltage signal to the leakage current detection integrated chip IC (e.g., model No. RV4145 sold by Fairchild Semiconductor Co.; or LM 1851 sold by National Semiconductor Co.). Pin 5 of the chip IC outputs a control signal to a silicon controlled rectifier (SCR) V4, causing the reset/tripping mechanical device on circuit board 18 to act, so that reset button 8 pops up and the GFCI trips, cutting off the power output from the GFCI.

As shown in FIG. 1, FIG. 5, FIG. 6-1, FIG. 7-1, FIG. 8-1, and FIG. 9-1, a reset/tripping mechanical device is also placed on circuit board 18 which causes input flexible metal pieces 50 and 51 to be electrically connected to or disconnected from output terminal metal pieces 80' and 81', and also causes user accessible output flexible metal pieces 20 and 21 to be electrically connected to or disconnected from output terminal metal pieces 80' and 81'.

The reset/tripping mechanical device includes a reset directional lock 35 which is embedded underneath reset button 8; reset spring 91 and quick trip spring 66-A which are slid onto reset directional lock 35; a reset support piece 28A; a "T" shaped tripping device 28 coupled to reset button 8; locking member 30; reset switch, i.e., top metal piece 67, middle metal piece 72, and contact 72A, which are coupled to reset button 8, and solenoid coil 26.

"T" shaped tripping device 28 is located directly below reset button 8 and is coupled to reset button 8. The left and right sides of "T" shaped tripping device 28 extend outward to form a pair of stepped lifting arms, i.e., cantilevers. Reset support piece 28A is located below reset button 8 and above "T" shaped tripping device 28. Reset support piece 28A can be combined with tripping device 28 and move up and down with tripping device 28. At the same time, reset support piece 28A can also be detached from tripping device 28 (see FIG. 9-1 to FIG. 9-3). In solenoid framework 26K of solenoid coil 26 which accommodates reset support piece 28A and tripping device 28, there is a limiting block 26H which limits the lowest possible movement of reset support piece 28A. The four corners 26E of reset support piece 28A are placed against limiting block 26H.

Figure 9:
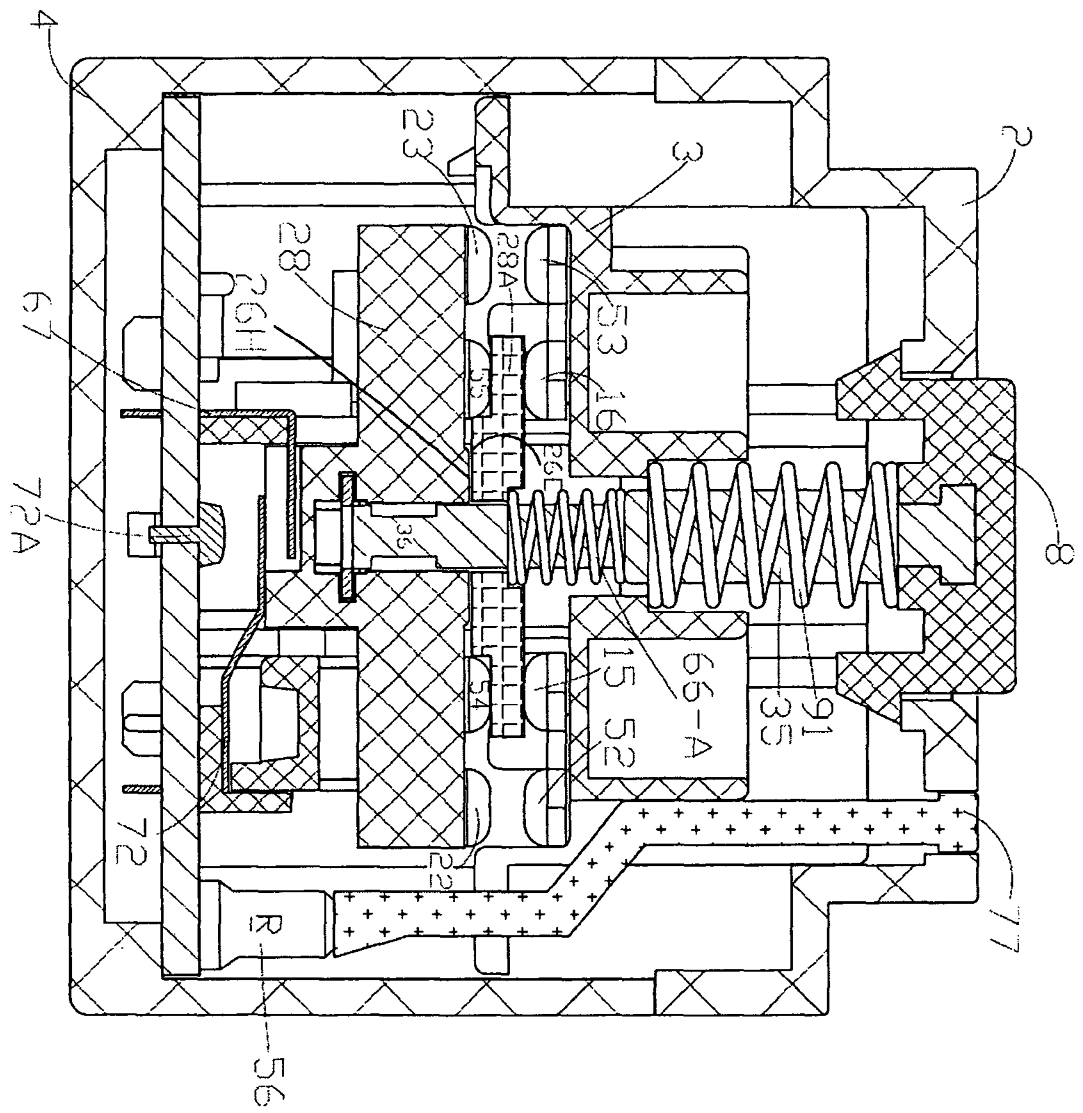
Figures 2, 9:
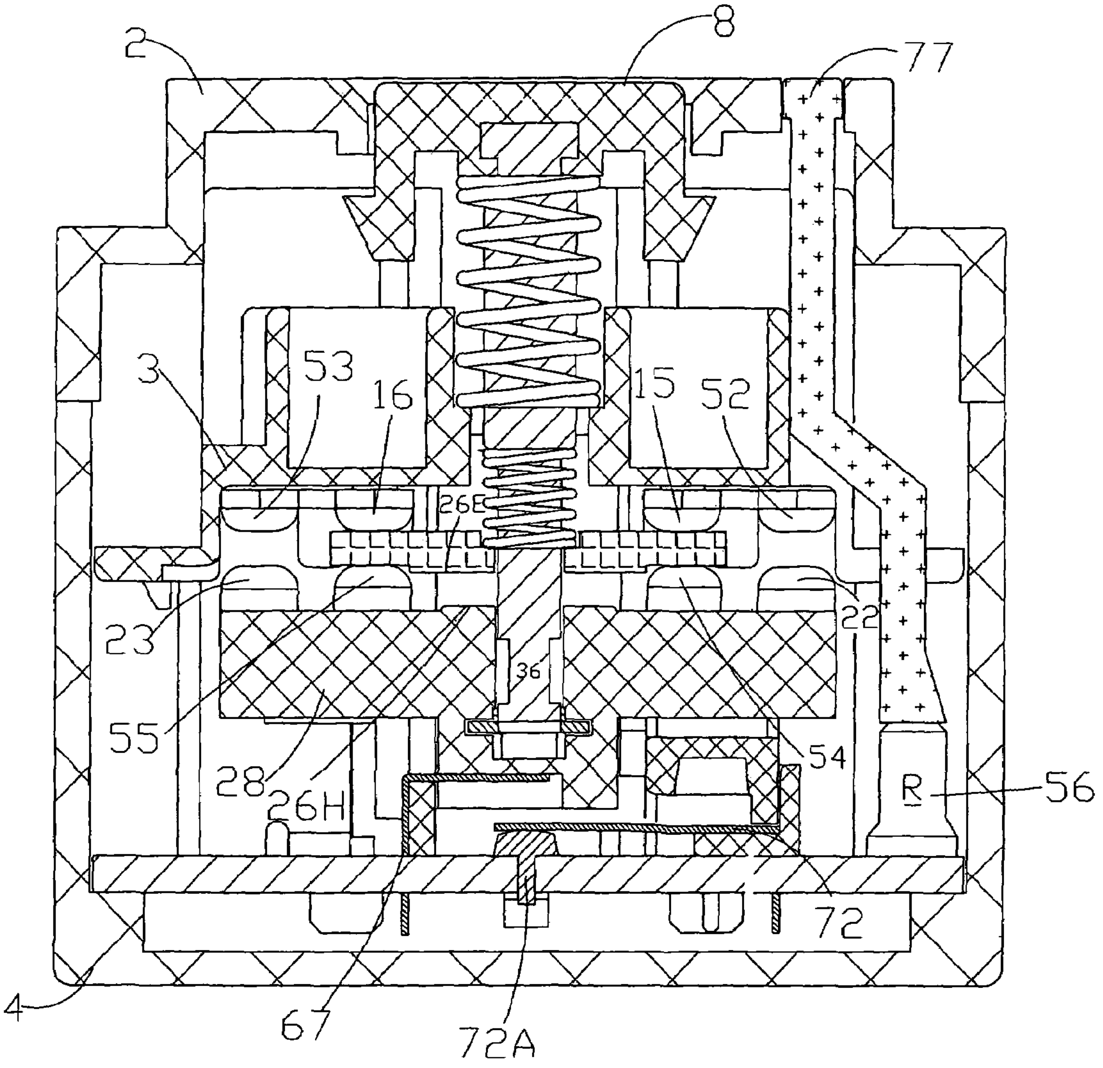
Figures 3, 9:
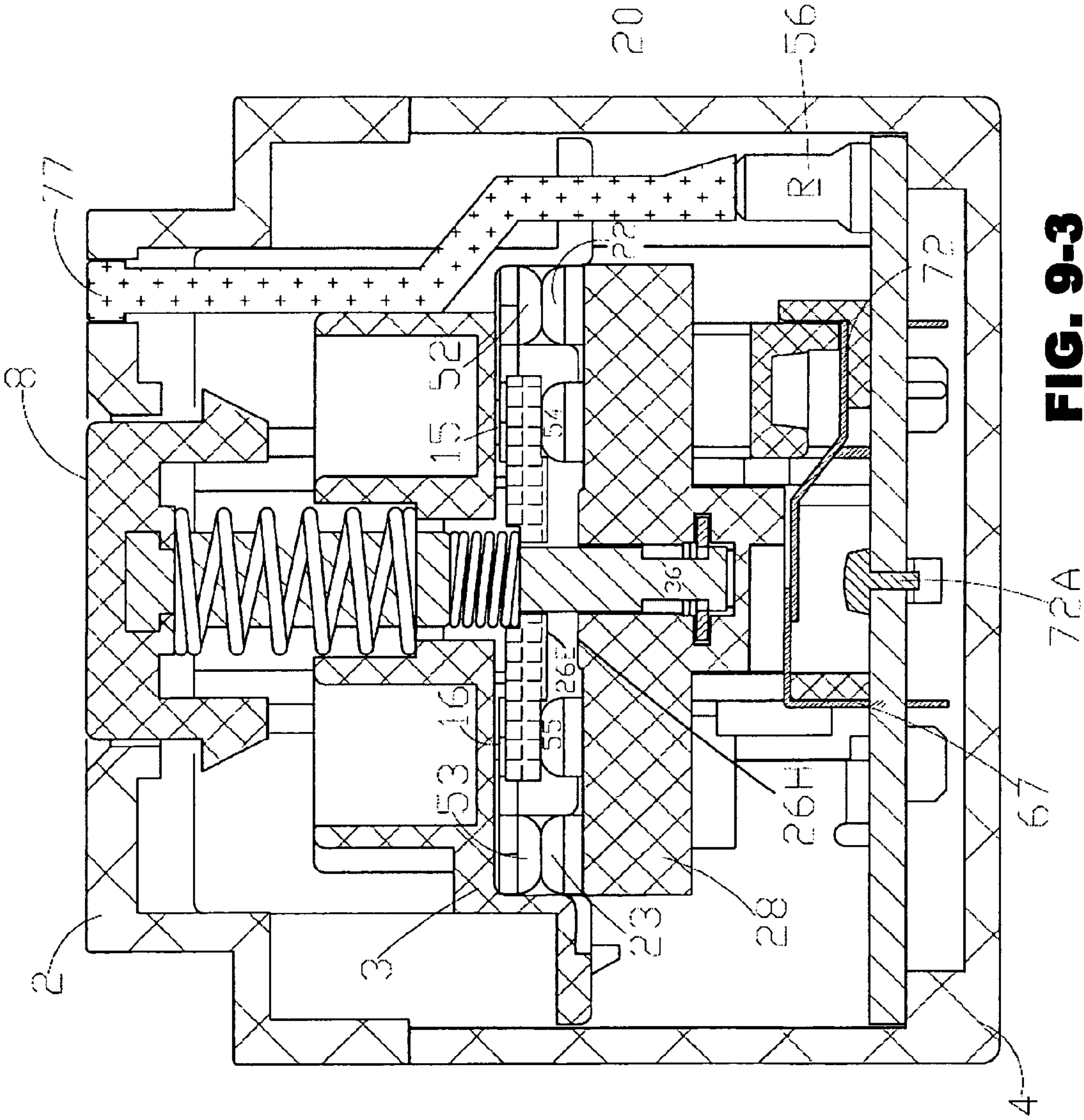

As shown in FIG. 9-1, when tripping device 28 and reset support piece 28A are assembled, input flexible metal pieces 51 and 50 and user accessible output flexible metal pieces 21 and 20 are respectively placed above the left and right lifting arms of tripping device 28 and below reset support piece 28A, so that input flexible metal pieces 51 and 50 are located between and move with the lifting arms of tripping device 28.

As shown in FIG. 6-1, FIG. 7-1, FIG. 8-1, and FIG. 9-1, in the middle of the reset support piece 28A, there is a vertical through hole 29A that allows reset directional lock 35 to be threaded through. In the middle of tripping device 28, there is also a vertical through hole 29 to allow reset directional lock 35 to thread through. Reset directional lock 35, which is embedded underneath reset button 8 and onto which reset spring 91 and quick trip spring 66-A are slid, can move up and down along the straight through hole 29A and central through hole 29 in the middle sections of reset support piece 28A and tripping device 28.

As shown in FIG. 6-1, FIG. 7-1, FIG. 8-1, and FIG. 9-1, the diameter of the upper part of the reset directional lock 35 is preferably larger than the diameter of the lower part. Step 35A is formed between the upper and lower parts of reset directional lock 35; reset spring 91 slides onto the upper part of reset directional lock 35 and is located between reset button 8 and insulated middle support 3; quick trip spring 66-A slides onto the lower part of reset directional lock 35 and is located between step 35A of reset directional lock 35 and reset support piece 28A. Quick tripping spring 66-A enables reset button 8 to be quickly and reliably released, causing movable contacts and fixed contacts to be quickly disconnected, thus greatly prolonging the life of the ground fault circuit interrupter.

A circular recessed locking groove 36 is located near the bottom of reset directional lock 35. The bottom of reset directional lock 35 is a blunt plane 41. When reset button 8 is at a tripped state, blunt plane 41 of reset directional lock 35 and a through hole 31 in locking member 30 are in a staggered position so that reset directional lock 35 cannot pass through locking member 30.

Tripping device 28 has a through hole 30E in the middle section. Locking member 30 is a movable "L" shaped latch, preferably made of metal materials. It is inserted across the middle section of tripping device 28 by through hole 30E. When reset button 8 is in a tripped state, blunt plane 41 of reset directional lock 35 is above locking member 30 and is in a staggered state with through hole 31 on top of locking member 30.

A solenoid coil 26 with a built-in movable iron core 42 is placed on the outside wall of locking member 30. Built-in movable iron core 42 of solenoid coil 26 directly faces the side wall of locking member 30. When solenoid coil 26 is energized, the iron core moves inward and plunges upon the outside wall of locking member 30 to force locking member 30 to move horizontally, thus enabling blunt plane 41 of reset directional lock 35 below reset button 8 to be aligned with through hole 31 and move downwards to facilitate reset of the device or move upward to facilitate tripping of the device. Movable iron core 42 has a tower shaped spring 42A slid at the end portion of the iron core 42.

Figure 6:
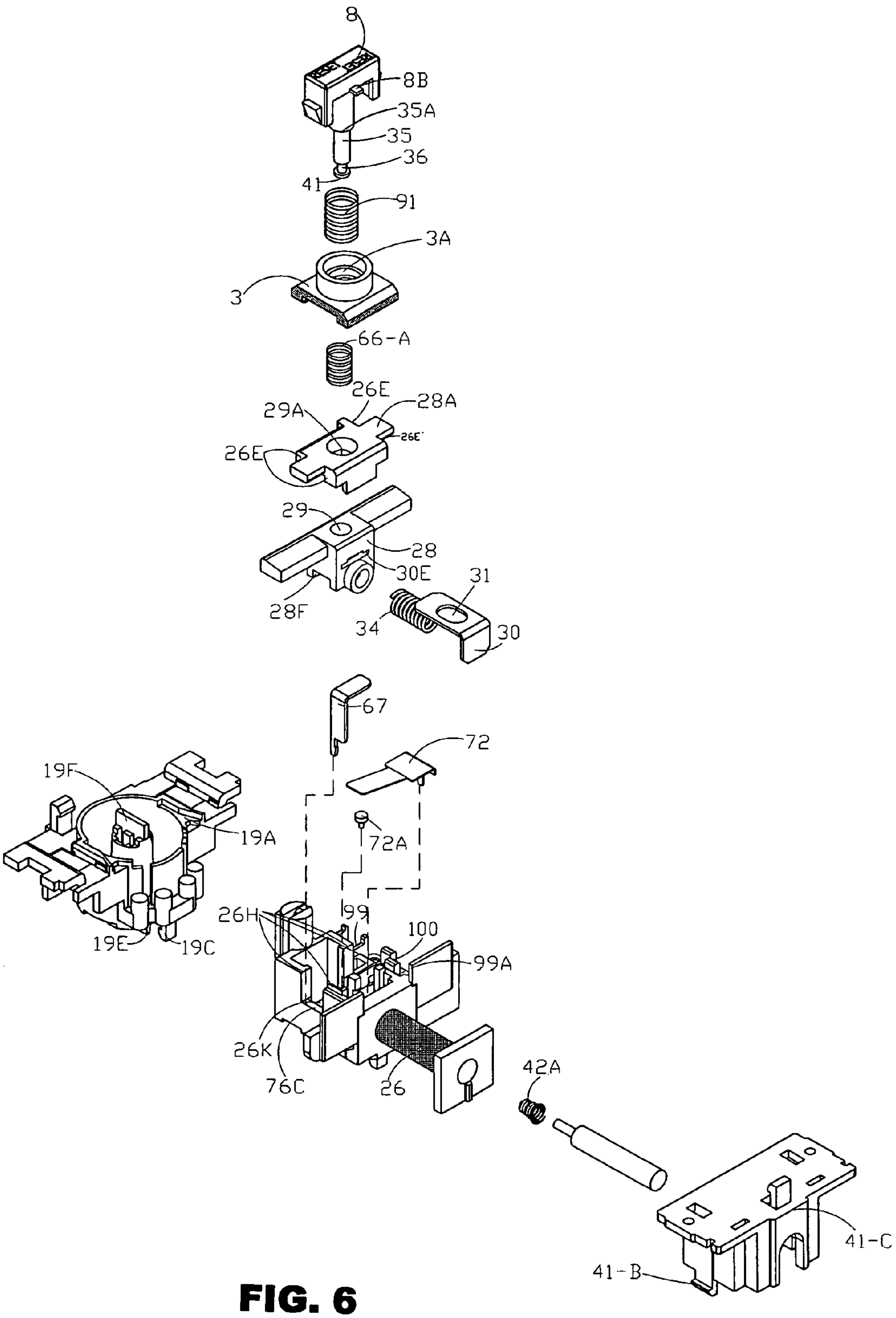
FIG. 6 is an exploded cubic schematic of the structure of the model reset/tripping mechanical construction of the present invention.
Figures 2, 6:
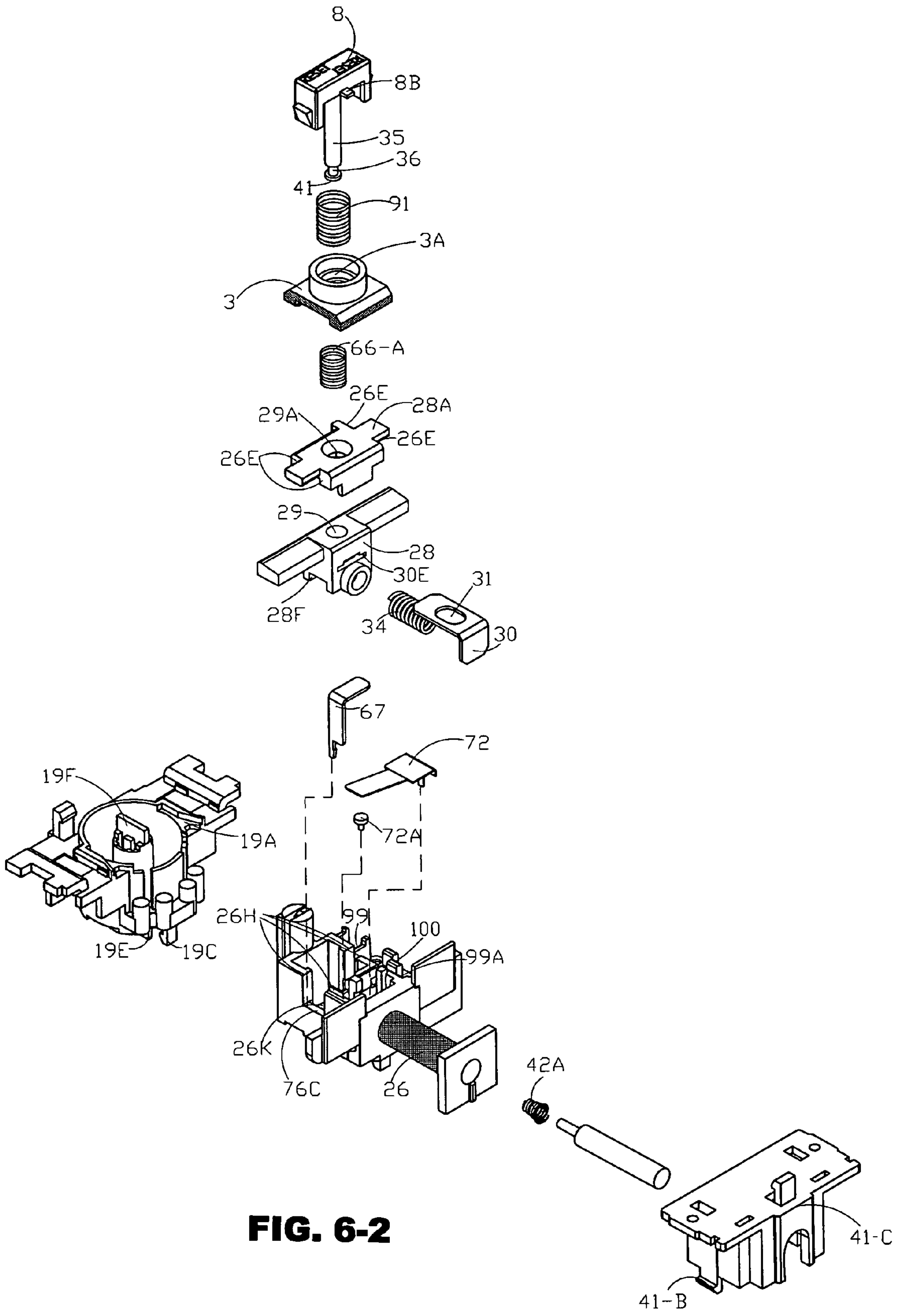

As shown in FIG. 6-1 and FIG. 7-1, reset button 8 in the present invention has a protrusion 8B that extends out on the side close to test button 7. Test button 7 also has a protrusion 7B that extends out at a corresponding location. Protrusion 7B on test button 7 is located below protrusion 8B on reset button 8. When reset button 8 is depressed, protrusion 8B on reset button 8 drives test button 7 to move downwards with reset button 8 through protrusion 7B on test button 7. A flexible metal piece 46 is located underneath test button 7. A test resistor 47 is located underneath flexible metal piece 46. When reset button 8 is in a tripped state and in a reset state, test resistor 47 does not come into contact with flexible metal piece 46. As shown in FIG. 10-1 to FIG. 10-4, one end of flexible metal piece 46 is located below test button 7 and the other end is connected to the hot power line or neutral power line that threads through differential transformers L1 and L2 (19). One end of test resistor 47 is suspended in the air below flexible metal piece 46 while the other end is connected to the neutral power line on the power input end.

As shown in FIGS. 7-1 and 7-2, when the GFCI is in a tripped state (FIG. 7-1) and a user desires to use the GFCI, the user presses reset button 8 (FIG. 7-2) and if all of the key components in the GFCI are working properly, the GFCI will have power output. When reset button 8 is depressed, test button 7 is pushed down. Flexible metal piece 46 below test button 7 comes into contact with test resistor 47. The hot power line or neutral power line that threads through the differential transformer is connected to the neutral power line on the power input terminal, thus generating a leakage current. If the GFCI is intact and still has leakage current protection functions, the reset/tripping mechanical device acts, causing the reset button to move to the reset position. If GFCI has come to the end of its life (i.e., at least one key component in the GFCI is damaged or not functioned properly) and cannot protect against ground fault, then reset/tripping mechanical device does not act and reset button 8 cannot be reset. The GFCI does not have power output. The status of whether the GFCI has come to an end of the service life can be displayed by an indicator light, reminding the user to promptly replace the GFCI. Thus, in the present invention, depressing reset button 8 causes test button 7 to move to automatically test whether ground fault circuit interrupter has come to the end of its life and to display the test result.

As shown in FIGS. 7-3 and 7-4, when the GFCI is in the reset state (FIG. 7-3), the flexible metal piece 46 is separated from the test resistor 47. If, at this time, the user wants to trip the device, he/she can depress the test button 7 (FIG. 7-4), which causes the flexible metal piece 46 to be in contact with the test resistor 47 to generate a leakage current which causes the device to trip. If, at this time, one or more of the components in the GFCI is not working properly, the device cannot be tripped.

As shown in FIG. 6, FIG. 7-1 and FIG. 9-1, a reset switch coupled to reset button (RESET) 8 and is placed below tripping device 28. The reset switch includes top metal piece 67, middle metal piece 72 and bottom electric contact 72A.

Bottom electric contact 72A is located at the bottom. Middle metal piece 72 is located in the middle and top metal piece 67 is located at the top. Middle metal piece 72 is above bottom electric contact 72A and top metal piece 67 is above middle metal piece 72. As shown in FIG. 10-1 to FIG. 10-4, top metal piece 67 and middle metal piece 72 form a switch KR-1, bottom electric contact 72A and middle metal piece 72 form another switch KR-4.

As shown in FIG. 7-1 and FIG. 9-1, when reset button 8 is at a tripped state top metal piece 67, middle metal piece 72 and bottom electric contact 72A do not contact with each other. KR-1 and KR-4 of the reset switch are in a nonconductive state. The GFCI does not have power output. When reset button 8 is depressed down, as shown in FIG. 7-2 and FIG. 9-2, top metal piece 67 and middle metal piece 72 are still in a nonconductive state. Lower surface of middle metal piece 72 and bottom electric contact 72A come into contact and become conducted. Reset switch KR-1 is in a nonconductive state and reset switch KR-4 is closed. Reset/tripping mechanical device acts. However, at this time, the GFCI still does not have power output. The GFCI will have power output when the end-of-life component test is successfully completed and the GFCI has been successfully reset.

As shown in FIG. 7-3, FIG. 8-1 and FIG. 9-3, when reset button 8 is in a reset state, the lower surface of top metal piece 67 and the upper surface of middle metal piece 72 come into contact. The lower surface of middle metal piece 72 and bottom electric contact 72A are in a nonconductive state. Reset switch KR-1 is closed and reset switch KR-4 is in a nonconductive state. The GFCI has power output.

As shown in FIG. 7-4 and FIG. 8-2, when reset button 8 is in a tripped state, top metal piece 67, middle metal piece 72 and bottom electric contact 72A are all in a nonconductive state. Reset switch KR-1 and KR-4 are both in a nonconductive state. The coupled switches KR-2-1, KR-2-2, KR-3-1 and, KR-3-2 are also in a nonconductive state. The GFCI does not have power output.

As shown in FIGS. 10-1 to 10-4, when the GFCI is in the reset state, and test button 7 is depressed to generate a simulated leakage current, the differential transformer 19 detects such an imbalance of the current and sends out a signal to the leakage current detection integrated circuit chip (IC), which in turn output a control signal from Pin 5 of IC to the gate of silicon controlled rectifier (SCR) V4. Because in the reset state, top metal piece 67 and the upper surface of middle metal piece 72 are in contact with each other, the output of the signal to the SCR V4 causes the solenoid coil L3-1 to energize and generate an electromagnetic field, which in turn causes the reset/tripping mechanical device to trip the GFCI, so that the GFCI does not have power output.

As shown in FIG. 10-1 to FIG. 10-4, one end of top metal piece 67 is suspended in the air and the other end is welded onto the circuit board. After top metal piece 67 is serially connected to silicon controlled rectifier (SCR) V4 on control circuit board 18, it is connected to the neutral power line on the power input terminal. One end of middle metal piece 72 is suspended in the air and the other end is welded onto circuit board. Middle metal piece 72 is connected to the hot power line on the power input terminal through the solenoid coil (SOL). Bottom electric contact 72A is also welded onto the circuit board and is connected to the neutral line on the power input terminal through the silicon controlled rectifier (SCR).

As shown in FIG. 6, reset support piece 28A, tripping device 28, locking member 30, and the reset switch coupled to reset button 8, i.e., top metal piece 67, middle metal piece 72 and bottom electric contact 72A, are all shielded within solenoid framework 26K of the solenoid coil 26. There is a solenoid coil protection shield 41-C outside the coil of solenoid coil 26. On its left and right sides, there is respectively a hooked pin 41-B which is used to hook onto circuit board 18.

Reset directional lock 35 that forms the reset/tripping mechanical device, reset spring 91 and quick trip spring 66-A that slide onto reset directional lock 35, reset support piece 28A, the "T" shaped tripping device 28 that is coupled to reset button 8, locking member 30, the reset switch coupled to reset button 8, i.e., top metal piece 67, middle metal piece 72 and bottom electric contact 72A, and solenoid coil 26 are interconnected to form a freely movable body and support each other.

FIG. 6-1 is an exploded cubic view illustrating the structure of the reset/tripping mechanical device in the present invention. One skilled in the art will appreciate that other structures can be equally applied to the reset/tripping mechanical device.

FIG. 6-2 is an exploded cubic view illustrating the structure of another type of reset/tripping mechanical device in the present invention. As shown in FIG. 6-2, the diameters of the upper part and lower part of reset directional lock 35 embedded below reset button 8 are the same; reset spring 91 slides onto the upper part of reset directional lock 35 and is located between reset button 8 and insulated middle support 3; quick trip spring 66-A slides onto the lower part of reset directional lock 35. The quick trip spring 66-A is located between insulated middle support 3 and reset support piece 28A.

FIG. 10-1 is the circuit diagram of the GFCI. As shown in the diagram, the control circuit mainly includes differential transformers L1 (1000:1) and L2 (200:1) used for detecting an electric leakage current, leakage current detection integrated circuit chip IC (e.g., RV4145 or LM 1851), solenoid coil L3 (SOL) with a built in iron core, silicon controlled rectifier (SCR) V4, switches KR-2-1, KR-2-2, KR-3-1 and KR-3-2 coupled to reset button RESET and serially connected in the power supply line, test button TEST switches, i.e., flexible metal piece 46 and test resistor 47, coupled to reset button RESET, reset switch KR-1 and KR-4, power output indicator LED1, simulated leakage current generating resistors R4 and R3 and some related diodes, resistor and capacitances, etc.

After the hot power line HOT and neutral power line WHITE on the power input ends of the GFCI pass through differential transformers L1 and L2, they are connected to the hot and neutral output (Load) ends through switches KR-2-1 and KR-2-2. At the same time, the hot and neutral output conductors 13, 14 that are electrically connected to the user accessible output terminals on the outlet socket of the upper lid are electrically connected to the hot and neutral output (Load) ends through switches KR-3-1 and KR-3-2. Switches KR-2-1, KR-2-2, KR-3-1, and KR-3-2 are capable of moving up and down with the reset button RESET.

The leakage current detection signal output ends of differential transformers L1 and L2 are connected to signal input pins 1, 2, 3 and 7 of the leakage current detection integrated circuit chip IC. Pin 5 of the control chip IC is connected to the gate of silicon controlled rectifier (SCR) V4. Power input Pin 6 of IC is connected to hot power line HOT on the power input end LINE of the GFCI through diode V1, resistor R1 and solenoid coil L3-1. Ground pin 4 of IC is connected to neutral power line WHITE on the power input terminal LINE of the GFCI.

The negative pole of silicon controlled rectifier (SCR) V4 is connected to neutral power line WHITE on the power input end LINE of the GFCI. The positive pole of silicon controlled rectifier (SCR) V4 is connected to the hot power line HOT on the power input end through switches KR-1/KR-4 including the reset switch and solenoid coil L3-1.

The iron core built-in solenoid coil L3-1 causes reset button RESET to reset or trip through the reset/tripping mechanical device inside the GFCI, thus causing switches KR-2-1, KR-2-2, KR-3-1, KR-3-2, KR-1, and KR-4 to close or disconnect. The opening and closing of switches KR-2-1, KR-2-2, KR-3-1, KR-3-2, KR-1, and KR-4 are directly or indirectly affected by the movement of the reset button.

A power output indicator light LED1 is connected between power output end LOAD of the hot power line and the neutral power line of the GFCI. It is used to indicate whether the GFCI has power output. When the GFCI has power output, LED1 is lit; otherwise, LED1 is not lit. When the GFCI is in a tripped state, if the wiring of the GFCI is reverse (i.e., reverse wired), the LED1 indicator is lit, indicating a wiring error and the reset/tripping device automatically prevents the reset button from being reset.

As shown in FIG. 7-2 and FIG. 9-2, when reset button RESET is depressed, reset button 8 drives test button 7 to move downwards with it, causing flexible metal piece 46 to come into contact with test resistor 47 which generates a simulated leakage current to cause an imbalance current to be detected by the differential transformer 19, which generates a signal to send to IC, which in turn output a voltage signal to the gate of the SCR. At the same time, middle metal piece 72 of the reset switch comes into contact with bottom electric contact 72A and becomes conducted. Switch KR-4 in FIG. 10-1 is closed. Point A and point B in FIG. 10-1 have a short connection. The voltage output from the IC to the gate of the SCR V4 due to the contact of the flexible metal piece 46 and test resistor 47 enables the original voltage on Point A and Point B due to connection of middle metal piece 72 and bottom electric contact 72A to energize solenoid coil (SOL) L3, causing a certain current to flow through the solenoid coil and to generate an electromagnetic field. The iron core inside is engaged in an impact movement. Through the reset/tripping mechanical device, the reset button can be reset.

As shown in FIG. 7-3 and FIG. 8-1, the power outlet has power output. Power output indicator LED1 is lit. At the same time, as shown in FIG. 9-3, since reset button RESET is reset, test button 7 also moves up together with it. Flexible metal piece 46 is disconnected from test resistor 47, and the simulated leakage current disappears. Middle metal piece 72 of the reset switch is disconnected from bottom electric contact 72A and KR-4 is open and becomes nonconductive. Top metal piece 67 comes into contact with middle metal piece 72 and KR-1 is closed and becomes conducted. After reset button RESET is reset, switches KR-2-1, KR-2-2, KR-3-1 and KR-3-2 coupled thereto are closed, the GFCI has power output and power output indicator LED1 is lit, indicating that both the user accessible output end and the output (Load) end have power output.

When the components of the GFCI are working properly, after the GFCI is properly connected to power, a user can press reset button RESET to drive the test button 7 to perform a test on the circuit. The GFCI can only be reset if the test is successful. The output end LOAD and the surface of the GFCI have power output and the GFCI works normally. At this time, when a leakage current is generated, due to the fact that hot power line HOT and neutral power line WHITE both thread through differential transformers L1 (1000:1) and L2 (200:1) at the same time, the vector sum of the current that flows through differential transformers L1 and L2 on the two power lines is not zero. Differential transformers L1 and L2 immediately sense a voltage signal with a certain value input into IC. A control signal is output from Pin 5 of IC to the gate of silicon controlled rectifier (SCR) V4. Silicon controlled rectifier (SCR) V4 is triggered and the positive pole and the negative pole become conducted. The two ends of solenoid coil L3 receive a voltage of a certain value. A certain electric current flows through solenoid coil L3 and generates a magnetic field. The iron core inside of solenoid coil L3 is engaged in an impact movement, causing reset button RESET to be released through the reset/tripping mechanical device and cutting off power output. The fixed and movable contacts of the input flexible metal pieces, the user accessible output metal pieces, and the output terminal metal pieces within the GFCI become disconnected, cutting off power output. Power output indicator LED1 goes out.

In the above circumstances, the control signal output from pin 5 of IC needs to pass through and be connected to the interference resistant capacitor C5 between the gate of the silicon controlled rectifier (SCR) and the ground, in order to avoid the occurrence of an erroneous triggering.

When the GFCI works normally and has power output, in order to cut off its power output, as shown in FIG. 7-4 and FIG. 8-2, a user can press down on test button 7 to cause flexible metal piece 46 to come into contact with test resistor 47, generating a simulated leakage current and causing the reset/tripping mechanical device to act, thus causing reset button 8 to trip and be released, thus cutting off the power output.

As shown in FIG. 9-1, a power output indicator is placed on control circuit board 18. A vertically placed light guide tube 77 is placed on a power output indicator 56. Light guide tube 77 threads through hole D on insulated middle support 3 (as shown in FIG. 3). The top of light guide tube 77 is located below indicator hole 30-A on the surface of upper cover 2.

To improve the life of the GFCI and avoid any damage to the GFCI caused by instantaneous high voltage such as lightning or as a result of any other cause, as shown in FIG. 7-1, FIG. 8-1, and FIG. 5, one end of input flexible metal pieces 51 and 50 of the hot power line and neutral power line in the present invention threads through the differential transformer, before being connected to the pins of power input wiring pieces and discharge metal pieces 25A and 24A, and being welded onto circuit board 18. Discharge metal pieces 25A and 24A are shaped as right triangles and used for discharging. The tips of discharge metal pieces 25A and 24A are placed opposite to each other and keep a certain distance from each other.

In addition, hot power line HOT of the power input end passes through solenoid coil SOL and a voltage sensitive resistor, i.e., metal oxide varistor (MOV), to be connected to neutral power line WHITE on the power input end.

When an instantaneous high voltage caused by lightning or any other cause acts on the GFCI, the air media between the tips of the discharge metal pieces, which are connected to the hot power line on the input end, and the tips of discharge metal pieces, which are connected to the neutral power line on the input end, is broken down, causing the air to discharge. Most of the high voltage is consumed through the discharge metal pieces, and the small remaining part is consumed through solenoid coil SOL and the metal oxide varistor MOV, thus protecting the GFCI from being damaged by high voltage.

If the metal oxide varistor MOV used in the GFCI is a surge suppressing MOV, it has the capability of preventing electrophoresis.

As shown in FIG. 10-1 to FIG. 10-4, the GFCI of the present invention is also capable of preventing reverse wiring errors. As shown in the figures, the power output terminals (LOAD) of the GFCI are connected to the user accessible output sockets on the surface of the GFCI through switches KR-3-1 and KR-3-2 on the output terminal metal pieces 80', 81' and the user accessible output flexible metal pieces 20, 21, respectively; hot power line and neutral power line on the input terminals of the GFCI are connected to the hot and neutral power output terminals (Load) through switches KR-2-1 and KR-2-2 on the input flexible metal pieces 50, 51, and the output terminal metal pieces 80', 81', respectively.

However, the flexible metal piece 46 and the test resistor 47 underneath the test button 7 are electrically only connected to the power input terminals. Therefore, if an installer of GFCI erroneously connects the power line inside a wall to the load output terminal LOAD of a GFCI, a depression of the reset button will not generate a leakage current even when the flexible metal piece 46 and the test resistor 47 are momentarily close. The leakage current detection integrated circuit chip (IC) cannot output any control signal. Silicon controlled rectifier (SCR) V4 is not conductive. Additionally, the top metal piece 67, the middle metal piece 72, and the bottom electric contact 72A of the reset switch are also only electrically connected to the power input terminals. Therefore, the depression of the reset button will not activate the reset switch even though the middle metal piece 72 and the bottom electric contact can be momentarily closed when the reset button is depressed. No voltage will be applied to Points A and B (FIGS. 10-1 to 10-4). No current will be flown through solenoid coil (SOL), thus no electromagnetic field is generated to push the built-in iron core to act. The reset/tripping mechanical device does not act, thus automatically preventing the reset button from being reset.

Because switches KR-2-1, KR-2-2, KR-3-1 and KR-3-2 are coupled to reset button RESET, the non-movement of the reset button causes switches KR-2-1, KR-2-2, KR-3-1 and KR-3-2 to stay opened. Neither the input end LINE nor the power socket on the surface of the GFCI has power output. Reset indicator LED1 is lit, indicating a wiring error. It is only after the installer properly connects the wire then reset button can be reset and the GFCI has power output.

While the GFCI that combines reset and test buttons has been described in connection with an exemplary embodiment, those skilled in the art will understand that many modifications in light of these teachings are possible, and this application is intended to cover variations thereof. Therefore, the scope of the appended claims should be accorded the broadest interpretation so as to encompass all such modifications.

What is claimed is:

1. A circuit interrupting device having a pair of power input terminals, a pair of power output terminals, and a pair of user accessible output terminals, which are electrically separated from each other in a tripped state and electrically connected in a reset state; said circuit interrupting device further comprising:

a reset button;

a test button;

a flexible metal piece located underneath said test button; and a test resistor located below said flexible metal piece;

wherein when said circuit interrupting device is properly wired and at said tripped state, depressing said reset button drives said test button to move downwards with said reset button so that said flexible metal piece beneath said test button comes into contact with said test resistor to generate a simulated leakage current to test whether components of said circuit interrupting device are working properly;

wherein when said components of said circuit interrupting device are working properly, said circuit interrupting device is capable of being reset; and wherein when at least one of said components of said circuit interrupting device is not working properly, said circuit interrupting device cannot be reset.

2. The circuit interrupting device according to claim 1, wherein said reset button has a first protrusion extending outward;

wherein said test button has a second protrusion extending outward and at a location corresponding to said first protrusion;

wherein when said reset button is depressed, said first protrusion drives said test button to move downwards with said reset button through said second protrusion.

3. The circuit interrupting device according to claim 1, further comprising a power output indicator that is turned on when said components of said circuit interrupting device are working properly.

4. The circuit interrupting device according to claim 1, wherein when said reset button is at said tripped or reset state, said test resistor is disconnected from said flexible metal piece and no simulated leakage current is generated.

5. The circuit interrupting device according to claim 1, wherein said components of said circuit interrupting device comprises a differential transformer, a leakage circuit detection integrated chip, a silicon controlled rectifier (SCR), and/or a solenoid coil.

6. The circuit interrupting device according to claim 1, wherein one end of said flexible metal piece is positioned below said test button and the other end is electrically connected to one of said pair of power input terminals.

7. The circuit interrupting device according to claim 1, wherein one end of said test resistor is suspended below said flexible metal piece and the other end is connected to one of said pair of power input terminals.

8. The circuit interrupting device according to claim 1, further comprising:

a pair of input flexible metal pieces electrically coupled to said pair of power input terminals; wherein each of said pair of power input flexible metal pieces contains a movable contact;

a pair of output terminal metal pieces coupled to said pair of power output terminals; wherein each of said pair of power output terminal metal pieces contains a pair of fixed contacts; and a pair of user accessible output flexible metal pieces electrically coupled to a pair of output conductors that is coupled to said pair of user accessible output terminals; wherein each of said pair of user accessible output flexible metal pieces contains a movable contact;

wherein said movable contact on each of said pair of input flexible metal pieces and said movable contact on each of said pair of output metal pieces are capable of connecting to or disconnecting from said pair of fixed contacts on each of said output terminal metal pieces respectively.

9. The circuit interrupting device according to claim 8, further comprising a reset/tripping mechanical device capable of causing said pair of input flexible metal pieces, said pair of user accessible output flexible metal pieces, and said pair of output terminal metal pieces to be connected or disconnected.

10. The circuit interrupting device according to claim 9, wherein said reset/tripping mechanical device comprises:

said reset button;

a reset directional lock located under said reset button, wherein said reset directional lock has a blunt bottom surface;

a reset spring slid onto an upper part of said reset directional lock;

a quick trip spring slid onto a lower part of said reset directional lock;

a tripping device;

a locking member; and a reset switch.

11. The circuit interrupting device according to claim 10, wherein when said circuit interrupting device is properly wired and said reset button is depressed, if said components of said circuit interrupting device are working properly, said reset/tripping mechanical device causes said circuit interrupting device to be reset; and if at least one of said components of said circuit interrupting device is not working properly, said reset/tripping mechanical device does not act to allow said circuit interrupting device to be reset.

12. The circuit interrupting device according to claim 1, further comprises a reset switch which is coupled to said reset button;

wherein said reset switch comprises a top metal piece, a middle metal piece, and a bottom electric contact; wherein said top metal piece is located at the top of said reset switch, said middle metal piece is located below said top metal piece; and said bottom electric contact is located below said middle metal piece;

wherein when said reset button is at said tripped state, none of said top metal piece, said middle metal piece, and said bottom electric contact is in contact with each other;

wherein when said reset button is depressed, said middle metal piece and said bottom electric contact come into contact with each other; and wherein when said reset button is at a reset state, said top metal piece and said middle metal piece come into contact with each other.

13. The circuit interrupting device according to claim 12, wherein each of said top metal piece, said middle metal piece, and said bottom electric contact is electrically connected to one of said pair of power input terminals.

14. The circuit interrupting device according to claim 13, wherein said top metal piece is electrically coupled to a neutral power input terminal, said middle metal piece is electrically coupled to a hot power input terminal, and said bottom electric contact is electrically coupled to said neutral power input terminal.

15. The circuit interrupting device according to claim 14, wherein said top metal piece and said bottom electric contact passes through a silicon controlled rectifier (SCR) to be electrically connected to said neutral power input terminal; and wherein said middle metal piece passes through a solenoid coil to be electrically connected to said hot power input terminal.

16. The circuit interrupting device according to claim 10, wherein said tripping device extends outwards to form a pair of lifting arms; wherein said pair of input flexible metal pieces and said pair of user accessible output flexible metal pieces are rested on said pair of lifting arms.

17. The circuit interrupting device according to claim 10, wherein said reset directional lock has a larger diameter in an upper part than in a lower part.

18. The circuit interrupting device according to claim 1, wherein said circuit interrupting device further comprises a pair of discharge metal pieces electrically coupled to said pair of power input terminals; wherein each of said pair of discharge metal pieces has a tip facing but not contacting each other;

whereby during a high voltage surge said discharge metal pieces cause a discharge of electricity through said tips of said discharge metal pieces to protect said circuit interrupting device from being damaged due to said high voltage surge.

19. The circuit interrupting device according to claim 1, wherein when said circuit interrupting device is at said reset state, a depression of said test button causes said flexible metal piece and said test resistor to be in contact with each other to generate said leakage current to trip said circuit interrupting device.

20. A circuit interrupting device having a pair of power input terminals, a pair of power output terminals, and a pair of user accessible output terminals, which are electrically separated from each other in a tripped state and electrically connected in a reset state; said circuit interrupting device further comprising:

a reset switch capable of preventing reset when said circuit interrupting device is not properly wired and/or at least one component of said circuit interrupting device is not working properly;

a reset button;

a test button;

a flexible metal piece located underneath said test button; and a test resistor located below said flexible metal piece;

wherein said reset switch comprises a top metal piece, a middle metal piece, and a bottom electric contact; wherein said top metal piece is located at the top of said reset switch, said middle metal piece is located below said top metal piece; and said bottom electric contact is located below said middle metal piece;

wherein each of said top metal piece, said middle metal piece, and said bottom electric contact is electrically coupled to one of said pair of power input terminals, wherein said reset switch is coupled to a reset button;

wherein when said reset button is at a tripped state, none of said top metal piece, said middle metal piece, and said bottom electric contact is in contact with each other;

wherein when said reset button is depressed, said middle metal piece and said bottom electric are in contact with each other;

wherein when said reset button is at a reset state, said top metal piece and said middle metal piece are in contact with each other;

wherein when said circuit interrupting device is properly wired and at said tripped state, a depression of said reset button drives said test button to move downwards with said reset button so that said flexible metal piece underneath said test button comes into contact with said test resistor to generate a simulated leakage current to test whether said components of said circuit interrupting device are working properly;

wherein when said components of said circuit interrupting device are working properly, said contact between said middle metal piece and said bottom electric contact allows said circuit interrupting device to be reset; and wherein when at least one of said components of said circuit interrupting device is not working properly, said contact between said middle metal piece and said bottom electric contact does not allow said circuit interrupting device to be reset.

21. The circuit interrupting device according to claim 20, wherein when said circuit interrupting device is in said reset state, a depression of said test button causes said flexible metal piece and said test resistor to be in contact with each other to generate said leakage current to trip said circuit interrupting device.

* * * * *